(12) United States Patent
Sullivan et al.

(10) Patent No.: US 9,433,829 B2
(45) Date of Patent: Sep. 6, 2016

(54) DUAL CORE GOLF BALL HAVING POSITIVE-HARDNESS-GRADIENT THERMOPLASTIC INNER CORE AND POSITIVE-HARDNESS-GRADIENT THERMOSET OUTER CORE LAYER

(71) Applicant: Acushnet Company, Fairhaven, MA (US)

(72) Inventors: Michael J. Sullivan, Old Lyme, CT (US); Brian Comeau, Berkley, MA (US); Robert Blink, Newport, RI (US); David A. Bulpett, Boston, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 14/578,787
(22) Filed: Dec. 22, 2014
(65) Prior Publication Data

US 2015/0111667 A1    Apr. 23, 2015

Related U.S. Application Data

(63) Continuation-in-part of application No. 14/282,229, filed on May 20, 2014, now Pat. No. 9,149,689, which is a continuation-in-part of application No. 13/477,344, filed on May 22, 2012, now Pat. No. 8,727,912, which is a continuation of application No. 13/036,642, filed on Feb. 28, 2011, now abandoned, which is a continuation of application No. 12/342,545, filed on Dec. 23, 2008, now Pat. No. 7,946,934, which is a continuation-in-part of application No. 12/339,495, filed on Dec. 19, 2008, now Pat. No. 7,815,526, which is a continuation-in-part of application No. 12/196,522, filed on Aug. 22, 2008, now Pat. No. 7,582,025, which is a continuation of application No. 11/939,635, filed on Nov. 14, 2007, now Pat. No. 7,427,242.

(51) Int. Cl.
*A63B 37/06* (2006.01)
*A63B 37/00* (2006.01)
*A63B 37/02* (2006.01)
*A63B 45/00* (2006.01)
*C08L 23/08* (2006.01)

(52) U.S. Cl.
CPC ....... *A63B 37/0063* (2013.01); *A63B 37/0039* (2013.01); *A63B 37/0043* (2013.01); *A63B 37/0044* (2013.01); *A63B 37/0051* (2013.01); *A63B 37/0059* (2013.01); *A63B 37/0062* (2013.01); *A63B 37/0075* (2013.01); *A63B 37/0076* (2013.01); *A63B 37/0092* (2013.01); *A63B 37/02* (2013.01); *A63B 45/00* (2013.01); *C08L 23/0876* (2013.01); *A63B 37/0045* (2013.01); *A63B 37/0064* (2013.01)

(58) Field of Classification Search
CPC .................................................. A63B 37/0059
USPC ........................................................ 473/376
See application file for complete search history.

(56) References Cited

U.S. PATENT DOCUMENTS

| 4,732,944 A | 3/1988 | Smith, Jr. |
| 5,274,041 A | 12/1993 | Yamada |

(Continued)

*Primary Examiner* — Raeann Gorden
(74) *Attorney, Agent, or Firm* — William B. Lacy

(57) ABSTRACT

A golf ball includes a thermoplastic inner core and a thermoset outer core layer. The inner core has a surface hardness of about 40 to 80 Shore C and a center hardness of about 30 to 75 Shore C, the center hardness being less than the surface hardness to define a first positive hardness gradient. The cover includes an inner cover layer and an outer cover layer. The thermoplastic inner core comprises a highly-neutralized ionomer including an acid copolymer of ethylene and an α,β-unsaturated carboxylic acid; a plasticizer; an organic acid or salt thereof; and a cation source present in an amount sufficient to neutralize from about 70 to 100% of the acid groups present. The outer core layer includes a polybutadiene rubber and has a surface hardness greater than an interior hardness to define a positive hardness gradient of less than about 25 Shore C.

20 Claims, 3 Drawing Sheets

(56) References Cited

U.S. PATENT DOCUMENTS

| | | | |
|---|---|---|---|
| 5,334,673 A | 8/1994 | Wu | |
| 5,356,941 A | 10/1994 | Sullivan et al. | |
| 5,484,870 A | 1/1996 | Wu | |
| 5,891,973 A | 4/1999 | Sullivan et al. | |
| 6,187,864 B1 * | 2/2001 | Rajagopalan | A63B 37/0003 473/372 |
| 6,213,895 B1 | 4/2001 | Sullivan et al. | |
| 6,431,998 B1 * | 8/2002 | Nakamura | A63B 37/0003 473/371 |
| 6,506,851 B2 | 1/2003 | Wu | |
| 6,605,009 B1 | 8/2003 | Nakamura et al. | |
| 6,632,147 B2 | 10/2003 | Cavallaro et al. | |
| 6,756,436 B2 * | 6/2004 | Rajagopalan | A63B 37/0004 473/372 |
| 6,835,794 B2 | 12/2004 | Wu et al. | |
| 6,855,070 B2 | 2/2005 | Hogge et al. | |
| 6,932,720 B2 | 8/2005 | Hogge et al. | |
| 7,004,854 B2 | 2/2006 | Hogge et al. | |
| 7,118,496 B2 | 10/2006 | Matroni et al. | |
| 7,147,578 B2 | 12/2006 | Nesbitt et al. | |
| 7,182,702 B2 | 2/2007 | Hogge et al. | |
| 7,198,576 B2 | 4/2007 | Sullivan et al. | |
| 7,279,529 B2 | 10/2007 | Hogge et al. | |
| 7,351,165 B2 | 4/2008 | Sullivan | |
| 7,427,242 B1 | 9/2008 | Sullivan et al. | |
| 7,458,905 B2 | 12/2008 | Comeau et al. | |
| 7,537,530 B2 | 5/2009 | Bulpett et al. | |
| 7,582,025 B2 | 9/2009 | Sullivan et al. | |
| 7,582,027 B2 | 9/2009 | Bulpett et al. | |
| 7,621,825 B2 | 11/2009 | Sullivan et al. | |
| 7,803,069 B2 | 9/2010 | Bulpett et al. | |
| 8,182,369 B2 | 5/2012 | Sullivan et al. | |
| 2006/0122011 A1 | 6/2006 | Hogge et al. | |
| 2009/0124416 A1 | 5/2009 | Sullivan et al. | |

* cited by examiner

DUAL CORE GOLF BALL HAVING POSITIVE-HARDNESS-GRADIENT THERMOPLASTIC INNER CORE AND POSITIVE-HARDNESS-GRADIENT THERMOSET OUTER CORE LAYER

CROSS-REFERENCE TO RELATED APPLICATIONS

This application is a continuation-in-part of U.S. patent application Ser. No. 14/282,229, filed May 20, 2014, which is a continuation-in-part of U.S. patent application Ser. No. 13/477,344, filed May 22, 2012 and now U.S. Pat. No. 8,727,912, which is a continuation of U.S. patent application Ser. No. 13/036,642, filed Feb. 28, 2011 and now abandoned, which is a continuation of U.S. patent application Ser. No. 12/342,545, filed Dec. 23, 2008 and now U.S. Pat. No. 7,946,934, which is a continuation-in-part of U.S. patent application Ser. No. 12/339,495, filed Dec. 19, 2008 and now U.S. Pat. No. 7,815,526, which is a continuation-in-part of U.S. patent application Ser. No. 12/196,522, filed Aug. 22, 2008 and now U.S. Pat. No. 7,582,025, which is a continuation of U.S. patent application Ser. No. 11/939,635, filed Nov. 14, 2007 and now U.S. Pat. No. 7,427,242, the disclosures of which are incorporated herein by reference thereto.

FIELD OF THE INVENTION

This invention relates generally to golf balls with cores, more particularly thermoplastic cores, having a surface hardness less than the center hardness to define a "negative" hardness gradient.

BACKGROUND OF THE INVENTION

Solid golf balls are typically made with a solid core encased by a cover, both of which can have multiple layers, such as a dual core having a solid center (or inner core) and an outer core layer, or a multi-layer cover having inner and outer cover layers. Generally, golf ball cores and/or centers are constructed with a thermoset rubber, such as a polybutadiene-based composition.

Thermoset polymers, once formed, cannot be reprocessed because the molecular chains are covalently bonded to one another to form a three-dimensional (non-linear) crosslinked network. The physical properties of the uncrosslinked polymer (pre-cure) are dramatically different than the physical properties of the crosslinked polymer (post-cure). For the polymer chains to move, covalent bonds would need to be broken—this is only achieved via degradation of the polymer resulting in dramatic loss of physical properties.

Thermoset rubbers are heated and crosslinked in a variety of processing steps to create a golf ball core having certain desirable characteristics, such as higher or lower compression or hardness, that can impact the spin rate of the ball and/or provide better "feel." These and other characteristics can be tailored to the needs of golfers of different abilities. Due to the nature of thermoset materials and the heating/curing cycles used to form them into cores, manufacturers can achieve varying properties across the core (i.e., from the core surface to the center of the core). For example, most conventional single core golf ball cores have a 'hard-to-soft' hardness gradient from the surface of the core towards the center of the core.

In a conventional, polybutadiene-based core, the physical properties of the molded core are highly dependent on the curing cycle (i.e., the time and temperature that the core is subjected to during molding). This time/temperature history, in turn, is inherently variable throughout the core, with the center of the core being exposed to a different time/temperature (i.e., shorter time at a different temperature) than the surface (because of the time it takes to get heat to the center of the core) allowing a property gradient to exist at points between the center and core surface. This physical property gradient is readily measured as a hardness gradient, with a typical range of 5 to 40 Shore C, and more commonly 10 to 30 Shore C, being present in virtually all golf ball cores made from about the year 1970 on.

The patent literature contains a number of references that discuss 'hard-to-soft' hardness gradients across a thermoset golf ball core. Additionally, a number of patents disclose multilayer thermoset golf ball cores, where each core layer has a different hardness in an attempt to artificially create a hardness 'gradient' between core layer and core layer. Because of the melt properties of thermoplastic materials, however, the ability to achieve varied properties across a golf ball core has not been possible.

Unlike thermoset materials, thermoplastic polymers can be heated and re-formed, repeatedly, with little or no change in physical properties. For example, when at least the crystalline portion of a high molecular weight polymer is softened and/or melted (allowing for flow and formability), then cooled, the initial (pre-melting) and final (post-melting) molecular weights are essentially the same. The structure of thermoplastic polymers are generally linear, or slightly branched, and there is no intermolecular crosslinking or covalent bonding, thereby lending these polymers their thermolabile characteristics. Therefore, with a thermoplastic core, the physical properties pre-molding are effectively the same as the physical properties post-molding. Time/temperature variations have essentially no effect on the physical properties of a thermoplastic polymer.

As such, there is a need for a golf ball core, in particular a dual core, that has a gradient from the surface to the center. The gradient may be either soft-to-hard (a "negative" gradient), hard-to-soft (a "positive" gradient), or, in the case of a dual core having a thermoplastic inner core layer, a combination of both gradients. A core exhibiting such characteristics would allow the golf ball designer to create a thermoplastic core golf ball with unique gradient properties allowing for differences in ball characteristics such as compression, "feel," and spin.

SUMMARY OF THE INVENTION

The present invention is directed to a golf ball including an inner core layer consisting essentially of a thermoplastic material and having a geometric center hardness greater than a surface hardness to define a negative hardness gradient; an outer core layer disposed about the inner core, the outer core being formed from a substantially homogenous thermoset composition and having an inner surface hardness less than an outer surface hardness to define a positive hardness gradient; an inner cover layer disposed outer core layer; and an outer cover layer disposed about the inner cover layer, wherein the negative hardness gradient is from −1 to −5 Shore C, the positive hardness gradient is less than 25 Shore C, and a difference between the inner core surface hardness and the outer core inner surface hardness, Δh, is less than 25 Shore C.

In one embodiment, the thermoplastic material includes an ionomer, a highly-neutralized ionomer, a thermoplastic polyurethane, a thermoplastic polyurea, a styrene block copolymer, a polyester amide, polyester ether, a polyethylene acrylic acid copolymer or terpolymer, or a polyethylene methacrylic acid copolymer or terpolymer.

Preferably, the difference between the inner core surface hardness and the outer core inner surface hardness, Δh, is less than Shore C, more preferably less than 15 Shore C. The inner core center hardness should be about 90 Shore C to about 100 Shore C. The inner core surface hardness should be about 85 Shore C to about 95 Shore C. The hardness of the inner surface of the outer core layer should be about 65 Shore C to about 75 Shore C. The hardness of the outer surface of the outer core layer should be about 80 Shore C to about 90 Shore C.

Preferably, the outer core layer includes diene rubber and a metal salt of a carboxylic acid in an amount of about 25 phr to about 40 phr. In one particular embodiment, hardness of the inner surface of the outer core layer and the hardness of the outer surface of the outer core layer are both less than the hardness of the outer surface of the inner core. Optionally, the outer core layer includes a soft and fast agent.

The present invention is also directed to a golf ball including an inner core layer consisting of a thermoplastic material and having a geometric center hardness greater than a surface hardness to define a negative hardness gradient between −1 Shore C and −5 Shore C; an outer core layer disposed about the inner core, the outer core being formed from a substantially homogenous thermoset composition comprising a diene rubber and having an inner surface hardness less than an outer surface hardness to define a positive hardness gradient of less than 25 Shore C; a cover layer disposed outer core layer, the cover layer comprising an inner cover layer comprising an ionomer and an outer cover layer comprising a castable polyurethane or polyurea material, wherein a difference between the inner core surface hardness and the outer core inner surface hardness, Δh, is less than 20 Shore C.

The present invention is further directed to a golf ball including an inner core layer consisting of a thermoplastic material and having a geometric center hardness greater than a surface hardness to define a negative hardness gradient between −1 Shore C and −5 Shore C, the center hardness being about 90 Shore C to about 100 Shore C and the surface hardness being about 85 Shore C to about 95 Shore C; an outer core layer disposed about the inner core, the outer core being formed from a substantially homogenous thermoset composition comprising a diene rubber and having an inner surface hardness less than an outer surface hardness to define a positive hardness gradient of less than 25 Shore C, the inner surface being about 65 Shore C to about 75 Shore C and the surface being about 80 Shore C to about 90 Shore C; a cover layer disposed outer core layer, the cover layer comprising an inner cover layer comprising an ionomer and an outer cover layer comprising a castable polyurethane or polyurea material, wherein a difference between the inner core surface hardness and the outer core inner surface hardness, Δh, is less than 20 Shore C.

The present invention is directed to a golf ball having a core including a thermoplastic inner core and a thermoset outer core layer. The inner core has a surface hardness of about 40 to 80 Shore C and a center hardness of about 30 to 75 Shore C. The center hardness of the inner core is less than the surface hardness of the inner core so that it has a positive hardness gradient. A cover layer is formed over the core. The cover includes an inner cover layer and an outer cover layer. The thermoplastic inner core includes a highly-neutralized ionomer comprising a copolymer of ethylene and an α,β-unsaturated carboxylic acid, an organic acid or salt thereof, and sufficient cation source to neutralize the acid groups of the copolymer by 80% or greater. The outer core layer includes a polybutadiene rubber and has a positive hardness gradient of less than 25 Shore C.

In one embodiment, the thermoplastic inner core further includes an ethylene/acid copolymer or ionomer. Preferably, the positive hardness gradient is 1 to 15 Shore C. In another embodiment, the acid groups of the copolymer are neutralized by 90% or greater. The organic acid or salt thereof may include barium, lithium, sodium, zinc, bismuth, chromium, cobalt, copper, potassium, strontium, titanium, tungsten, magnesium, cesium, iron, nickel, silver, aluminum, tin, or calcium salts, or, additionally, the salts of fatty acids. In this case, the fatty acid salt includes stearic acid, behenic acid, erucic acid, oleic acid, linoelic acid or dimerized derivatives thereof. Preferably, the organic acid or salt thereof comprises a magnesium salt of oleic acid.

In an alternative embodiment, the acid copolymer further includes a softening comonomer. The highly-neutralized ionomer may also further include a second polymer component, such as ionomeric copolymers and terpolymers, ionomer precursors, thermoplastics, polyamides, polycarbonates, polyesters, polyurethanes, polyureas, thermoplastic elastomers, polybutadiene rubber, balata, grafted- or non-grafted metallocene-catalyzed polymers, single-site polymers, high-crystalline acid polymers, or cationic ionomers.

The present invention is also directed to a golf ball having a core including a thermoplastic inner core and a thermoset outer core layer. The inner core has a surface hardness of about 60 to 90 Shore C and a center hardness of about 65 to 95 Shore C. The center hardness is less than the surface hardness such that the inner core layer has a positive hardness gradient. A cover is formed around the core and includes an inner cover layer and an outer cover layer. The thermoplastic inner core includes a highly-neutralized ionomer comprising a copolymer of ethylene and an α,β-unsaturated carboxylic acid, an organic acid or salt thereof, and sufficient cation source to neutralize the acid groups of the copolymer by 80% or greater. The outer core layer includes a polybutadiene rubber and has a surface hardness greater than an interior hardness such that the outer core layer has a positive hardness gradient of less than 25 Shore C.

The present invention is directed to a golf ball includes a thermoplastic inner core and a thermoset outer core layer. The inner core has a surface hardness of about 40 to 80 Shore C and a center hardness of about 30 to 75 Shore C, the center hardness being less than the surface hardness to define a first positive hardness gradient. The cover includes an inner cover layer and an outer cover layer. The thermoplastic inner core comprises a highly-neutralized ionomer including an acid copolymer of ethylene and an α,β-unsaturated carboxylic acid; a plasticizer; an organic acid or salt thereof; and a cation source present in an amount sufficient to neutralize from about 70 to 100% of the acid groups present. The outer core layer includes a polybutadiene rubber and has a surface hardness greater than an interior hardness to define a positive hardness gradient of less than about 25 Shore C.

The thermoplastic inner core may further include an ethylene/acid copolymer or ionomer. In one embodiment, the positive hardness gradient is 1 to 15 Shore C. The acid groups of the copolymer are preferably neutralized by 90% or greater, more preferably about 100%. The organic acid or salt thereof includes barium, lithium, sodium, zinc, bismuth, chromium, cobalt, copper, potassium, strontium, titanium, tungsten, magnesium, cesium, iron, nickel, silver, aluminum, tin, or calcium salts, or salts of fatty acids. The fatty acid salt includes stearic acid, behenic acid, erucic acid, oleic acid, linoelic acid or dimerized derivatives thereof. Preferably, tthe organic acid or salt thereof includes a magnesium salt of oleic acid.

The acid copolymer may further include a softening comonomer and/or the highly-neutralized ionomer may include a second polymer component, such as ionomeric copolymers and terpolymers, ionomer precursors, thermoplastics, polyamides, polycarbonates, polyesters, polyurethanes, polyureas, thermoplastic elastomers, polybutadiene rubber, balata, grafted- or non-grafted metallocene-catalyzed polymers, single-site polymers, high-crystalline acid polymers, or cationic ionomers.

The present invention is also directed to a golf ball having a thermoplastic inner core and a thermoset outer core layer. The inner core has a surface hardness of about 60 to 90 Shore C and a center hardness of about 65 to 95 Shore C. The center hardness is less than the surface hardness to define a positive hardness gradient. The cover includes an inner cover layer and an outer cover layer. The thermoplastic inner core includes a highly-neutralized ionomer formed from an acid copolymer of ethylene and an $\alpha,\beta$-unsaturated carboxylic acid, an optional softening monomer such as alkyl acrylate or methacrylate, a plasticizer; an organic acid or salt thereof; and a cation source present in an amount sufficient to neutralize from about 70 to about 100% of all acid groups present in the composition. The outer core layer includes a polybutadiene rubber and has a surface hardness greater than the interior hardness to define a positive hardness gradient of less than about 25 Shore C.

The thermoplastic inner core may include an ethylene/acid copolymer or ionomer. In one embodiment, the positive hardness gradient is 1 to 15 Shore C. The acid groups of the copolymer are preferably neutralized by 90% or greater, more preferably about 100%. The organic acid or salt thereof can be barium, lithium, sodium, zinc, bismuth, chromium, cobalt, copper, potassium, strontium, titanium, tungsten, magnesium, cesium, iron, nickel, silver, aluminum, tin, or calcium salts, or salts of fatty acids. The fatty acid salt can be stearic acid, behenic acid, erucic acid, oleic acid, linoleic acid or dimerized derivatives thereof. Preferably, the organic acid or salt thereof is a magnesium salt of oleic acid. The acid copolymer may include an optional softening comonomer and/or the highly-neutralized ionomer may include a second polymer component, such as ionomeric copolymers and terpolymers, ionomer precursors, thermoplastics, polyamides, polycarbonates, polyesters, polyurethanes, polyureas, thermoplastic elastomers, polybutadiene rubber, balata, grafted- or non-grafted metallocene-catalyzed polymers, single-site polymers, high-crystalline acid polymers, or cationic ionomers.

DETAILED DESCRIPTION OF THE INVENTION

Figure 1:
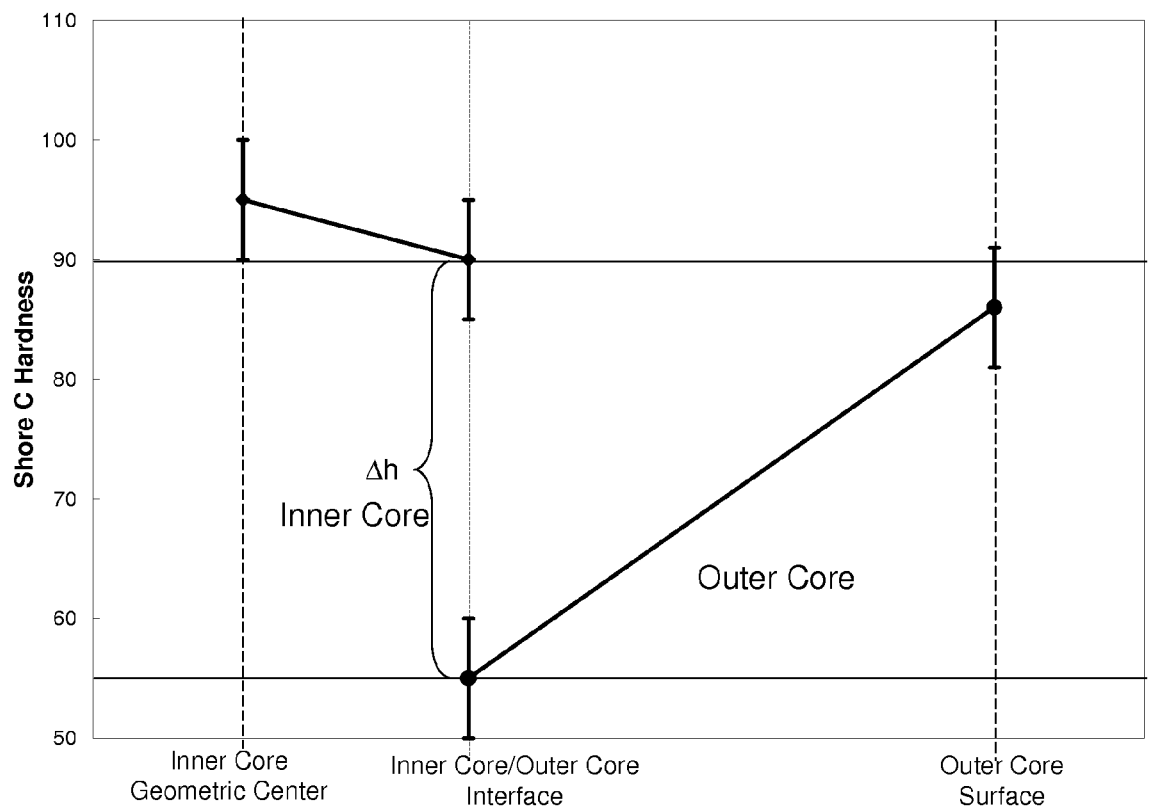
FIG. 1 is a graph showing preferred hardness values and relationships between the "negative" hardness gradient thermoplastic inner core layer and the steep "positive" hardness gradient thermoset outer core layer of the present invention.

The golf balls of the present invention may include a single-layer (one-piece) golf ball, and multi-layer golf balls, such as one having a core and a cover surrounding the core, but are preferably formed from a core comprised of a solid center (otherwise known as an inner core layer) and an outer core layer, and a cover layer. Of course, any of the core and/or the cover layers may include more than one layer. In a preferred embodiment, the core is formed of a thermoplastic inner core layer and a rubber-based outer core layer where the inner core has a "soft-to-hard" hardness gradient (a "negative" hardness gradient) as measured radially inward from the outer surface and the outer core layer has a "hard-to-soft" hardness gradient (a "positive" hardness gradient) as measured radially inward from the outer core outer surface.

The inventive cores may have a hardness gradient defined by hardness measurements made at the surface of the inner core (or outer core layer) and at points radially inward towards the center of the inner core, typically at 2-mm increments. As used herein, the terms "negative" and "positive" hardness gradients refer to the result of subtracting the hardness value at the innermost portion of the component being measured (e.g., the center of a solid core or an inner core in a dual core construction; the inner surface of a core layer; etc.) from the hardness value at the outer surface of the component being measured (e.g., the outer surface of a solid core; the outer surface of an inner core in a dual core; the outer surface of an outer core layer in a dual core, etc.). For example, if the outer surface of a solid core has a lower hardness value than the center (i.e., the surface is softer than the center), the hardness gradient will be deemed a "negative" gradient (a smaller number–a larger number=a negative number).

In a preferred embodiment, the golf balls of the present invention include an inner core layer formed from a thermoplastic (TP) material to define a "negative" hardness gradient and an outer core layer formed from a thermoset (TS) material to define a shallow (less than 25 Shore C points) "positive" hardness gradient. The TP hardness gradient may be created by exposing the cores to a high-energy radiation treatment, such as electron beam or gamma radiation, such as disclosed in U.S. Pat. No. 5,891,973, which is incorporated by reference thereto, or lower energy radiation, such as UV or IR radiation; a solution treatment, such as in a isocyanate, silane, plasticizer, or amine solution, such as suitable amines disclosed in U.S. Pat. No. 4,732,944, which is incorporated by reference thereto; incorporation of additional free radical initiator groups in the TP prior to molding; chemical degradation; and/or chemical modification, to name a few. The magnitude of the "negative" hardness gradient is preferably greater than (more negative) −1 Shore C, more preferably greater than −3 Shore C, and most preferably greater than −5 Shore C. In one specific embodiment, the magnitude of the "negative" hardness gradient is −1 to −5.

Preferably, the core or core layers (inner core or outer core layer), most preferably the inner core layer, are formed from a composition including at least one thermoplastic material. Preferably, the thermoplastic material comprises highly neutralized polymers; ethylene/acid copolymers and ionomers; ethylene/(meth)acrylate ester/acid copolymers and ionomers; ethylene/vinyl acetates; polyetheresters; polyetheramides; thermoplastic polyurethanes; metallocene catalyzed polyolefins; polyalkyl(meth)acrylates; polycarbonates;

polyamides; polyamide-imides; polyacetals; polyethylenes (i.e., LDPE, HDPE, UHMWPE); high impact polystyrenes; acrylonitrile-butadiene-styrene copolymers; polyesters; polypropylenes; polyvinyl chlorides; polyetheretherketones; polyetherimides; polyethersulfones; polyimides; polymethylpentenes; polystyrenes; polysulfones; or mixtures thereof. In a more preferred embodiment, the thermoplastic material is a highly-neutralized polymer, preferably a fully-neutralized ionomer. Other suitable thermoplastic materials are disclosed in U.S. Pat. Nos. 6,213,895 and 7,147,578, which are incorporated herein by reference thereto.

In a preferred embodiment, the inner core layer is formed from an HNP material or a blend of HNP materials. The acid moieties of the HNP's, typically ethylene-based ionomers, are preferably neutralized greater than about 70%, more preferably greater than about 90%, and most preferably at least about 100%. The HNP's can be also be blended with a second polymer component, which, if containing an acid group, may be neutralized in a conventional manner, by the organic fatty acids of the present invention, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

In one embodiment of the present invention the HNP's are ionomers and/or their acid precursors that are preferably neutralized, either fully or partially, with organic acid copolymers or the salts thereof. The acid copolymers are preferably α-olefin, such as ethylene, $C_{3-8}$ α,β-ethylenically unsaturated carboxylic acid, such as acrylic and methacrylic acid, copolymers. They may optionally contain a softening monomer, such as alkyl acrylate and alkyl methacrylate, wherein the alkyl groups have from 1 to 8 carbon atoms.

The acid copolymers can be described as E/X/Y copolymers where E is ethylene, X is an α,β-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

Specific acid-containing ethylene copolymers include, but are not limited to, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include, ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate copolymers. The most preferred acid-containing ethylene copolymers are, ethylene/(meth)acrylic acid/n-butyl, acrylate, ethylene/(meth)acrylic acid/ethyl acrylate, and ethylene/(meth)acrylic acid/methyl acrylate copolymers.

Ionomers are typically neutralized with a metal cation, such as Li, Na, Mg, K, Ca, or Zn. It has been found that by adding sufficient organic acid or salt of organic acid, along with a suitable base, to the acid copolymer or ionomer, however, the ionomer can be neutralized, without losing processability, to a level much greater than for a metal cation. Preferably, the acid moieties are neutralized greater than about 80%, preferably from 90-100%, most preferably 100% without losing processability. This is accomplished by melt-blending an ethylene α,β-ethylenically unsaturated carboxylic acid copolymer, for example, with an organic acid or a salt of organic acid, and adding a sufficient amount of a cation source to increase the level of neutralization of all the acid moieties (including those in the acid copolymer and in the organic acid) to greater than 90%, (preferably greater than 100%).

The organic acids of the present invention are aliphatic, mono- or multi-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

The ionomers of the invention may also be more conventional ionomers, i.e., partially-neutralized with metal cations. The acid moiety in the acid copolymer is neutralized about 1 to about 90%, preferably at least about 20 to about 75%, and more preferably at least about 40 to about 70%, to form an ionomer, by a cation such as lithium, sodium, potassium, magnesium, calcium, barium, lead, tin, zinc, aluminum, or a mixture thereof.

The highly neutralized polymer composition of the inner core layer comprises an acid copolymer, a non-acid polymer, an organic acid or salt thereof, and a cation source present in an amount sufficient to neutralize greater than 80% of all acid groups present in the composition. The acid copolymer is a copolymer of ethylene and an α,β-unsaturated carboxylic acid, optionally including a softening monomer selected from the group consisting of alkyl acrylates and methacrylates. The non-acid polymer is selected from the group consisting of polyolefins, polyamides, polyesters, polyethers, polyurethanes, metallocene-catalyzed polymers, single-site catalyst polymerized polymers, ethylene propylene rubber, ethylene propylene diene rubber, styrenic block copolymer rubbers, alkyl acrylate rubbers, and functionalized derivatives thereof.

Set forth below are particularly suitable highly-neutralized polymer compositions for forming thermoplastic core layers. The following commercially-available materials were used in the below examples:

A-C® 5120 ethylene acrylic acid copolymer with an acrylic acid content of 15%, A-C® 5180 ethylene acrylic acid copolymer with an acrylic acid content of 20%, A-C® 395 high density oxidized polyethylene homopolymer, and A-C® 575 ethylene maleic anhydride copolymer, commercially available from Honeywell;

CB23 high-cis neodymium-catalyzed polybutadiene rubber, commercially available from Lanxess Corporation;

CA1700 Soya fatty acid, CA1726 linoleic acid, and CA1725 conjugated linoleic acid, commercially available from Chemical Associates;

Century® 1107 highly purified isostearic acid mixture of branched and straight-chain C18 fatty acid, commercially available from Arizona Chemical;

Clarix® 011370-01 ethylene acrylic acid copolymer with an acrylic acid content of 13% and Clarix® 011536-01 ethylene acrylic acid copolymer with an acrylic acid content of 15%, commercially available from A. Schulman Inc.;

Elvaloy® AC 1224 ethylene-methyl acrylate copolymer with a methyl acrylate content of 24 wt %, Elvaloy® AC 1335 ethylene-methyl acrylate copolymer with a methyl acrylate content of 35 wt %, Elvaloy® AC 2116 ethylene-ethyl acrylate copolymer with an ethyl acrylate content of 16 wt %, Elvaloy® AC 3427 ethylene-butyl acrylate copolymer having a butyl acrylate content of 27 wt %, and Elvaloy® AC 34035 ethylene-butyl acrylate copolymer having a butyl acrylate content of 35 wt %, commercially available from E.I. Dupont de Nemours and Company;

Escor® AT-320 ethylene acid terpolymer, commercially available from ExxonMobil Chemical Company;

Exxelor® VA 1803 amorphous ethylene copolymer functionalized with maleic anhydride, commercially available from ExxonMobil Chemical Company;

Fusabond® N525 metallocene-catalyzed polyethylene, Fusabond® N416 chemically modified ethylene elastomer, Fusabond® C190 anhydride modified ethylene vinyl acetate copolymer, and Fusabond® P614 functionalized polypropylene, commercially available from E.I. Dupont de Nemours and Company;

Hytrel® 3078 very low modulus thermoplastic polyester elastomer, commercially available from E.I. Dupont de Nemours and Company;

Kraton® FG 1901 GT linear triblock copolymer based on styrene and ethylene/butylene with a polystyrene content of 30% and Kraton® FG1924GT linear triblock copolymer based on styrene and ethylene/butylene with a polystyrene content of 13%, commercially available from Kraton Performance Polymers Inc.;

Lotader® 4603, 4700 and 4720, random copolymers of ethylene, acrylic ester and maleic anhydride, commercially available from Arkema Corporation;

Nordel® IP 4770 high molecular weight semi-crystalline EPDM rubber, commercially available from The Dow Chemical Company;

Nucrel® 9-1, Nucrel® 599, Nucrel® 960, Nucrel® 0407, Nucrel® 0609, Nucrel® 1214, Nucrel® 2906, Nucrel® 2940, Nucrel® 30707, Nucrel® 31001, and Nucrel® AE acid copolymers, commercially available from E.I. Dupont de Nemours and Company;

Primacor® 3150, 3330, 5980I, and 5990I acid copolymers, commercially available from The Dow Chemical Company;

Royaltuf® 498 maleic anhydride modified polyolefin based on an amorphous EPDM, commercially available from Chemtura Corporation;

Sylfat® FA2 tall oil fatty acid, commercially available from Arizona Chemical;

Vamac® G terpolymer of ethylene, methylacrylate and a cure site monomer, commercially available from E.I. Dupont de Nemours and Company; and XUS 60758.08L ethylene acrylic acid copolymer with an acrylic acid content of 13.5%, commercially available from The Dow Chemical Company.

Various compositions were melt blended using components as given in Table 18 below. The compositions were neutralized by adding a cation source in an amount sufficient to neutralize, theoretically, 110% of the acid groups present in components 1 and 3, except for example 72, in which the cation source was added in an amount sufficient to neutralize 75% of the acid groups. Magnesium hydroxide was used as the cation source, except for example 68, in which magnesium hydroxide and sodium hydroxide were used in an equivalent ratio of 4:1. In addition to components 1-3 and the cation source, example 71 contains ethyl oleate plasticizer.

The relative amounts of component 1 and component 2 used are indicated in Table 18 below, and are reported in wt %, based on the combined weight of components 1 and 2. The relative amounts of component 3 used are indicated in Table 1 below, and are reported in wt %, based on the total weight of the composition.

TABLE 1

| Ex. | Component 1 | wt % | Component 2 | wt % | Component 3 | wt % |
|---|---|---|---|---|---|---|
| 1 | Primacor 5980I | 78 | Lotader 4603 | 22 | magnesium oleate | 41.6 |
| 2 | Primacor 5980I | 84 | Elvaloy AC 1335 | 16 | magnesium oleate | 41.6 |
| 3 | Primacor 5980I | 78 | Elvaloy AC 3427 | 22 | magnesium oleate | 41.6 |
| 4 | Primacor 5980I | 78 | Elvaloy AC 1335 | 22 | magnesium oleate | 41.6 |
| 5 | Primacor 5980I | 78 | Elvaloy AC 1224 | 22 | magnesium oleate | 41.6 |
| 6 | Primacor 5980I | 78 | Lotader 4720 | 22 | magnesium oleate | 41.6 |
| 7 | Primacor 5980I | 85 | Vamac G | 15 | magnesium oleate | 41.6 |
| 8 | Primacor 5980I | 90 | Vamac G | 10 | magnesium oleate | 41.6 |
| 8.1 | Primacor 5990I | 90 | Fusabond 614 | 10 | magnesium oleate | 41.6 |
| 9 | Primacor 5980I | 78 | Vamac G | 22 | magnesium oleate | 41.6 |
| 10 | Primacor 5980I | 75 | Lotader 4720 | 25 | magnesium oleate | 41.6 |
| 11 | Primacor 5980I | 55 | Elvaloy AC 3427 | 45 | magnesium oleate | 41.6 |
| 12 | Primacor 5980I | 55 | Elvaloy AC 1335 | 45 | magnesium oleate | 41.6 |
| 12.1 | Primacor 5980I | 55 | Elvaloy AC 34035 | 45 | magnesium oleate | 41.6 |
| 13 | Primacor 5980I | 55 | Elvaloy AC 2116 | 45 | magnesium oleate | 41.6 |
| 14 | Primacor 5980I | 78 | Elvaloy AC 34035 | 22 | magnesium oleate | 41.6 |
| 14.1 | Primacor 5990I | 80 | Elvaloy AC 34035 | 20 | magnesium oleate | 41.6 |
| 15 | Primacor 5980I | 34 | Elvaloy AC 34035 | 66 | magnesium oleate | 41.6 |
| 16 | Primacor 5980I | 58 | Vamac G | 42 | magnesium oleate | 41.6 |
| 17 | Primacor 5990I | 80 | Fusabond 416 | 20 | magnesium oleate | 41.6 |
| 18 | Primacor 5980I | 100 | — | — | magnesium oleate | 41.6 |
| 19 | Primacor 5980I | 78 | Fusabond 416 | 22 | magnesium oleate | 41.6 |
| 20 | Primacor 5990I | 100 | — | — | magnesium oleate | 41.6 |

TABLE 1-continued

| Ex. | Component 1 | wt % | Component 2 | wt % | Component 3 | wt % |
|---|---|---|---|---|---|---|
| 21 | Primacor 5990I | 20 | Fusabond 416 | 80 | magnesium oleate | 41.6 |
| 21.1 | Primacor 5990I | 20 | Fusabond 416 | 80 | magnesium oleate | 31.2 |
| 21.2 | Primacor 5990I | 20 | Fusabond 416 | 80 | magnesium oleate | 20.8 |
| 22 | Clarix 011370 | 30.7 | Fusabond 416 | 69.3 | magnesium oleate | 41.6 |
| 23 | Primacor 5990I | 20 | Royaltuf 498 | 80 | magnesium oleate | 41.6 |
| 24 | Primacor 5990I | 80 | Royaltuf 498 | 20 | magnesium oleate | 41.6 |
| 25 | Primacor 5990I | 80 | Kraton FG1924GT | 20 | magnesium oleate | 41.6 |
| 26 | Primacor 5990I | 20 | Kraton FG1924GT | 80 | magnesium oleate | 41.6 |
| 27 | Nucrel 30707 | 57 | Fusabond 416 | 43 | magnesium oleate | 41.6 |
| 28 | Primacor 5990I | 80 | Hytrel 3078 | 20 | magnesium oleate | 41.6 |
| 29 | Primacor 5990I | 20 | Hytrel 3078 | 80 | magnesium oleate | 41.6 |
| 30 | Primacor 5980I | 26.8 | Elvaloy AC 34035 | 73.2 | magnesium oleate | 41.6 |
| 31 | Primacor 5980I | 26.8 | Lotader 4603 | 73.2 | magnesium oleate | 41.6 |
| 32 | Primacor 5980I | 26.8 | Elvaloy AC 2116 | 73.2 | magnesium oleate | 41.6 |
| 33 | Escor AT-320<br>Primacor 5980I | 30<br>18 | Elvaloy AC 34035 | 52 | magnesium oleate | 41.6 |
| 34 | Nucrel 30707 | 78.5 | Elvaloy AC 34035 | 21.5 | magnesium oleate | 41.6 |
| 35 | Nucrel 30707 | 78.5 | Fusabond 416 | 21.5 | magnesium oleate | 41.6 |
| 36 | Primacor 5980I | 26.8 | Fusabond 416 | 73.2 | magnesium oleate | 41.6 |
| 37 | Primacor 5980I | 19.5 | Fusabond N525 | 80.5 | magnesium oleate | 41.6 |
| 38 | Clarix 011536-01 | 26.5 | Fusabond N525 | 73.5 | magnesium oleate | 41.6 |
| 39 | Clarix 011370-01 | 31 | Fusabond N525 | 69 | magnesium oleate | 41.6 |
| 39.1 | XUS 60758.08L | 29.5 | Fusabond N525 | 70.5 | magnesium oleate | 41.6 |
| 40 | Nucrel 31001 | 42.5 | Fusabond N525 | 57.5 | magnesium oleate | 41.6 |
| 41 | Nucrel 30707 | 57.5 | Fusabond N525 | 42.5 | magnesium oleate | 41.6 |
| 42 | Escor AT-320 | 66.5 | Fusabond N525 | 33.5 | magnesium oleate | 41.6 |
| 43 | Nucrel 2906/2940 | 21 | Fusabond N525 | 79 | magnesium oleate | 41.6 |
| 44 | Nucrel 960 | 26.5 | Fusabond N525 | 73.5 | magnesium oleate | 41.6 |
| 45 | Nucrel 1214 | 33 | Fusabond N525 | 67 | magnesium oleate | 41.6 |
| 46 | Nucrel 599 | 40 | Fusabond N525 | 60 | magnesium oleate | 41.6 |
| 47 | Nucrel 9-1 | 44.5 | Fusabond N525 | 55.5 | magnesium oleate | 41.6 |
| 48 | Nucrel 0609 | 67 | Fusabond N525 | 33 | magnesium oleate | 41.6 |
| 49 | Nucrel 0407 | 100 | — | — | magnesium oleate | 41.6 |
| 50 | Primacor 5980I | 90 | Fusabond N525 | 10 | magnesium oleate | 41.6 |
| 51 | Primacor 5980I | 80 | Fusabond N525 | 20 | magnesium oleate | 41.6 |
| 52 | Primacor 5980I | 70 | Fusabond N525 | 30 | magnesium oleate | 41.6 |
| 53 | Primacor 5980I | 60 | Fusabond N525 | 40 | magnesium oleate | 41.6 |
| 54 | Primacor 5980I | 50 | Fusabond N525 | 50 | magnesium oleate | 41.6 |
| 55 | Primacor 5980I | 40 | Fusabond N525 | 60 | magnesium oleate | 41.6 |
| 56 | Primacor 5980I | 30 | Fusabond N525 | 70 | magnesium oleate | 41.6 |
| 57 | Primacor 5980I | 20 | Fusabond N525 | 80 | magnesium oleate | 41.6 |
| 58 | Primacor 5980I | 10 | Fusabond N525 | 90 | magnesium oleate | 41.6 |
| 59 | — | — | Fusabond N525 | 100 | magnesium oleate | 41.6 |
| 60 | Nucrel 0609<br>Nucrel 0407 | 40<br>40 | Fusabond N525 | 20 | magnesium oleate | 41.6 |
| 61 | Nucrel AE | 100 | — | — | magnesium oleate | 41.6 |
| 62 | Primacor 5980I | 30 | Fusabond N525 | 70 | CA1700 soya fatty acid magnesium salt | 41.6 |
| 63 | Primacor 5980I | 30 | Fusabond N525 | 70 | CA1726 linoleic acid magnesium salt | 41.6 |
| 64 | Primacor 5980I | 30 | Fusabond N525 | 70 | CA1725 conjugated linoleic acid magnesium salt | 41.6 |
| 65 | Primacor 5980I | 30 | Fusabond N525 | 70 | Century 1107 isostearic acid magnesium salt | 41.6 |
| 66 | A-C 5120 | 73.3 | Lotader 4700 | 26.7 | magnesium oleate | 41.6 |
| 67 | A-C 5120 | 73.3 | Elvaloy 34035 | 26.7 | magnesium oleate | 41.6 |
| 68 | Primacor 5980I | 78.3 | Lotader 4700 | 21.7 | magnesium oleate and sodium salt | 41.6 |
| 69 | Primacor 5980I<br>A-C 5180 | 47<br>40 | Elvaloy AC34035 | 13 | — | — |
| 70 | Primacor 5980I | 30 | Fusabond N525 | 70 | Sylfat FA2 magnesium salt | 41.6 |
| 71 | Primacor 5980I | 30 | Fusabond N525 | 70 | magnesium oleate<br>ethyl oleate | 31.2<br>10 |
| 72 | Primacor 5980I | 80 | Fusabond N525 | 20 | sebacic acid magnesium salt | 41.6 |
| 73 | Primacor 5980I<br>A-C 5180 | 60<br>40 | — | — | — | — |
| 74 | Primacor 5980I<br>A-C 575 | 78.3<br>21.7 | — | — | magnesium oleate | 41.6 |
| 75 | Primacor 5980I | 78.3 | Exxelor VA 1803 | 21.7 | magnesium oleate | 41.6 |
| 76 | Primacor 5980I | 78.3 | A-C 395 | 21.7 | magnesium oleate | 41.6 |
| 77 | Primacor 5980I | 78.3 | Fusabond C190 | 21.7 | magnesium oleate | 41.6 |
| 78 | Primacor 5980I | 30 | Kraton FG 1901 | 70 | magnesium oleate | 41.6 |
| 79 | Primacor 5980I | 30 | Royaltuf 498 | 70 | magnesium oleate | 41.6 |

TABLE 1-continued

| Ex. | Component 1 | wt % | Component 2 | wt % | Component 3 | wt % |
|---|---|---|---|---|---|---|
| 80 | A-C 5120 | 40 | Fusabond N525 | 60 | magnesium oleate | 41.6 |
| 81 | Primacor 5980I | 30 | Fusabond N525 | 70 | erucic acid magnesium salt | 41.6 |
| 82 | Primacor 5980I | 30 | CB23 | 70 | magnesium oleate | 41.6 |
| 83 | Primacor 5980I | 30 | Nordel IP 4770 | 70 | magnesium oleate | 41.6 |
| 84 | Primacor 5980I A-C 5180 | 48 32 | Fusabond N525 | 20 | magnesium oleate | 41.6 |
| 85 | Nucrel 2806 | 22.2 | Fusabond N525 | 77.8 | magnesium oleate | 41.6 |
| 86 | Primacor 3330 | 61.5 | Fusabond N525 | 38.5 | magnesium oleate | 41.6 |
| 87 | Primacor 3330 Primacor 3150 | 45.5 34.5 | Fusabond N525 | 20 | magnesium oleate | 41.6 |
| 88 | Primacor 3330 Primacor 3150 | 28.5 71.5 | — | — | magnesium oleate | 41.6 |
| 89 | Primacor 3150 | 67 | Fusabond N525 | 33 | magnesium oleate | 41.6 |
| 90 | Primacor 5980I | 55 | Elvaloy AC 34035 | 45 | magnesium oleate lt ethyl oleate | 31.2 10 |

Solid spheres of each composition were injection molded, and the solid sphere COR, compression, Shore D hardness, and Shore C hardness of the resulting spheres were measured after two weeks. The results are reported in Table 2 below.

TABLE 2

| Ex. | Solid Sphere COR | Solid Sphere Compression | Solid Sphere Shore D | Solid Sphere Shore C |
|---|---|---|---|---|
| 1 | 0.845 | 120 | 59.6 | 89.2 |
| 3 | 0.871 | 117 | 57.7 | 88.6 |
| 4 | 0.867 | 122 | 63.7 | 90.6 |
| 5 | 0.866 | 119 | 62.8 | 89.9 |
| 8.1 | 0.869 | 127 | 65.3 | 92.9 |
| 12 | 0.856 | 101 | 55.7 | 82.4 |
| 12.1 | 0.857 | 105 | 53.2 | 81.3 |
| 14 | 0.873 | 122 | 64.0 | 91.1 |
| 17 | 0.878 | 117 | 60.1 | 89.4 |
| 18 | 0.853 | 135 | 67.6 | 94.9 |
| 20 | 0.857 | 131 | 66.2 | 94.4 |
| 21 | 0.752 | 26 | 34.8 | 57.1 |
| 21.1 | 0.729 | 9 | 34.3 | 56.3 |
| 21.2 | 0.720 | 2 | 33.8 | 55.2 |
| 30 | ** | 66 | 42.7 | 65.5 |
| 31 | 0.730 | 67 | 45.6 | 68.8 |
| 32 | ** | 100 | 52.4 | 78.2 |
| 33 | 0.760 | 64 | 43.6 | 64.5 |
| 34 | 0.814 | 91 | 52.8 | 80.4 |
| 51 | 0.873 | 121 | 61.5 | 90.2 |
| 52 | 0.870 | 116 | 60.4 | 88.2 |
| 53 | 0.865 | 107 | 57.7 | 84.4 |
| 54 | 0.853 | 97 | 53.9 | 80.2 |
| 55 | 0.837 | 82 | 50.1 | 75.5 |
| 56 | 0.818 | 66 | 45.6 | 70.7 |
| 57 | 0.787 | 45 | 41.3 | 64.7 |
| 58 | 0.768 | 26 | 35.9 | 57.3 |

** sphere broke during measurement

HNP compositions may be used to form any core layer in accordance with the present invention. Suitable HNP compositions, which are plasticized per this invention, comprise an HNP, a plasticizer, and, optionally, a melt-flow modifier, additive, and/or filler. For purposes of the present disclosure, "HNP" generally refers to an acid polymer or blend of acid polymers in which about 80% or greater of the acid groups are neutralized. The HNPs are typically formed by reacting the acid copolymer with a sufficient amount of cation source, optionally in the presence of a high molecular weight organic acid or salt thereof, to neutralize the acid groups in the acid copolymer by about 80% or greater, more preferably about 90% or greater, and most preferably about 100%. The cation source may even be present in an amount sufficient to neutralize, in a stoichiometric sense, greater than 100% of the acid groups, more preferably about 110% or greater, and most preferably about 120% or greater, because the neutralization process is less than perfectly efficient. The acid copolymer can be reacted with the optional high molecular weight organic acid or salt thereof and the cation source simultaneously, or the acid copolymer can be reacted with the optional high molecular weight organic acid or salt thereof prior to the addition of the cation source. The resulting HNP composition is then introduced to a plasticizer by a variety of means, such as soaking, mixing, blending, and the like. Suitable plasticizers are described below.

Suitable acid polymers include, but are not limited to, copolymers of an α-olefin and a $C_3$-$C_8$ α,β-ethylenically unsaturated carboxylic acid. The α-olefin is preferably selected from ethylene and propylene. The acid is preferably (meth)acrylic acid, ethacrylic acid, maleic acid, crotonic acid, fumaric acid, or itaconic acid, with (meth)acrylic acid being particularly preferred. Preferred acid copolymers include, but are not limited to, those wherein the α-olefin is ethylene, the acid is (meth)acrylic acid, and the optional softening monomer is selected from (meth)acrylate, n-butyl (meth)acrylate, isobutyl(meth)acrylate, methyl(meth)acrylate, and ethyl(meth)acrylate. Particularly preferred acid copolymers include, but are not limited to, ethylene/(meth) acrylic acid/n-butyl acrylate, ethylene/(meth)acrylic acid/methyl acrylate, and ethylene/(meth)acrylic acid/ethyl acrylate. The acid polymer can, optionally, include a softening monomer, preferably alkyl(meth)acrylate, wherein the alkyl groups have from 1 to 8 carbons.

Suitable acid copolymers for forming the HNPs also include acid polymers that are already partially neutralized. Examples of suitable partially neutralized acid copolymers include, but are not limited to, SURLYN® ionomers, commercially available from Dupont; AClyn® ionomers, commercially available from Honeywell International Inc.; and IOTEK® ionomers, commercially available from ExxonMobil Chemical Company. Also suitable are HPF 1000 and HPF 2000, ionomeric materials commercially available from Dupont. In some embodiments, very low modulus ionomer-type ethylene-acid copolymers are particularly suitable for forming the HNPs and include SURLYN® 6320, SURLYN® 8120, SURLYN® 8320, and SURLYN® 9320, also commercially available from Dupont.

The α-olefin is typically present in the acid copolymer in an amount of about 15 wt % or greater, based on the total weight of the acid copolymer. More preferably, the α-olefin is typically present in the acid copolymer in an amount of about 25 wt % or greater, more preferably about 40 wt % or greater, and most preferably about 60 wt % or greater The acid is typically present in the acid copolymer in an amount of about 1 wt % to about 25 wt %, more preferably about 8 wt % to about 20 wt %, most preferably about 10 wt % to about 19 wt %, based on the total weight of the acid copolymer. The optional softening monomer is typically present in the acid copolymer in an amount of about 0 wt % to about 50 wt %, more preferably about 5 wt % to about 35 wt %, most preferably about 11 wt % to about 25 wt %, based on the total weight of the acid copolymer.

Suitable cation sources include metal ions and compounds of alkali metals, alkaline earth metals and transition metals; metal ions and compounds of rare earth elements; and combinations thereof. Preferred cation sources are metal ions and compounds of magnesium, sodium, potassium, cesium, calcium, barium, manganese, copper, zinc, tin, lithium, and rare earth metals. The acid copolymer may be at least partially neutralized prior to addition of the cation source to form the HNPs.

Suitable high molecular weight organic acids include aliphatic organic acids, aromatic organic acids, saturated monofunctional organic acids, unsaturated monofunctional organic acids, multi-unsaturated monofunctional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, dimerized derivatives thereof, and combinations thereof. Salts of high molecular weight organic acids comprise the salts, particularly the barium, lithium, sodium, zinc, bismuth, chromium, cobalt, copper, potassium, strontium, titanium, tungsten, magnesium, and calcium salts, of aliphatic organic acids, aromatic organic acids, saturated monofunctional organic acids, unsaturated monofunctional organic acids, multi-unsaturated monofunctional organic acids, dimerized derivatives thereof, and combinations thereof. The HNP compositions comprise an organic acid salt in an amount of about 20 phr or greater, more preferably about 30 phr or greater, most preferably about 40 phr or greater.

The plasticized HNP compositions of the present invention are not limited by any particular method or any particular equipment for making the compositions. Typically, the desired acid copolymers and plasticizers are fed into a melt extruder, such as a single or twin screw extruder. Other suitable methods for incorporating the plasticizer into the HNP compositions are described below. A suitable amount of cation source is then added such that at least about 80%, preferably about 90%, or most preferably 100%, of all acid groups present are neutralized. The acid copolymer may be at least partially neutralized prior to the above process.

The HNP ethylene acid copolymer compositions may contain one or more plasticizers. The plasticizers that may be used in the ethylene acid copolymer compositions of this invention include, for example, N-butylbenzenesulfonamide; N-ethylbenzenesulfonamide; N-propylbenzenesulfonamide; N-butyl-N-dodecylbenzenesulfonamide; N,N-dimethylbenzenesulfonamide; p-methylbenzenesulfonamide; o,p-toluene sulfonamide; p-toluene sulfonamide; 2-ethylhexyl-4-hydroxybenzoate; hexadecyl-4-hydroxybenzoate; 1-butyl-4-hydroxybenzoate; dioctyl phthalate; diisodecyl phthalate; di-(2-ethylhexyl)adipate; and tri-(2-ethylhexyl) phosphate; and blends thereof.

Other suitable plasticizers include polytetramethylene ether glycol, available from BASF under the tradename, PolyTHF™ 250; propylene carbonate, available from Huntsman Corp., under the tradename, JEFFSOL® PC; and/or dipropyleneglycol dibenzoate, available from Eastman Chemical under the tradename, BENZOFLEX® 284.

Plasticizers such as benzene mono-, di-, and tricarboxylic acid esters; phthalates such as bis(2-ethylhexyl)phthalate, diisononyl phthalate, di-n-butyl phthalate, butyl benzyl phthalate, diisodecyl phthalate, dioctyl phthalate, diisooctyl phthalate, diethyl phthalate, diisobutyl phthalate, and di-n-hexyl phthalate, and blends thereof are also suitable. Terephthalates, such as dioctyl terephthalate and dinonyl isophthalate may be used. Also appropriate are trimellitates such as trimethyl trimellitate, tri-(2-ethylhexyl)trimellitate, tri-(n-octyl,n-decyl)trimellitate, tri-(heptyl,nonyl)trimellitate, tri-n-octyl trimellitate; as well as benzoates, including: 2-ethylhexyl-4-hydroxy benzoate, n-octyl benzoate, methyl benzoate, and ethyl benzoate, and blends thereof.

Plasticizers may include alkyl diacid esters commonly based on $C_4$-$C_{12}$ alkyl dicarboxylic acids such as adipic, sebacic, azelaic, and maleic acids, such as bis(2-ethylhexyl) adipate, dimethyl adipate, monomethyl adipate, dioctyl adipate, dibutyl sebacate, dibutyl maleate, diisobutyl maleate, dioctyl sebacate, and blends thereof. Also, esters based on glycols, polyglycols and polyhydric alcohols such as poly (ethylene glycol) mono- and di-esters, cyclohexanedimethanol esters, sorbitol derivatives; and triethylene glycol dihexanoate, diethylene glycol di-2-ethylhexanoate, tetraethylene glycol diheptanoate, and ethylene glycol dioleate, and blends thereof, may be used.

Fatty acid esters also may be used as plasticizers in the compositions of this invention. Compounds such as stearic, oleic, ricinoleic, behenic, myristic, linoleic, palmitic, and lauric acid esters, salts, and mono- and bis-amides can be used. Ethyl oleate, butyl stearate, methyl acetylricinoleate, zinc oleate, ethylene bis-oleamide, and stearyl erucamide are suitable. Fatty alcohols and acetylated fatty alcohols are also suitable, as are carbonate esters such as propylene carbonate and ethylene carbonate. Mixtures of any of the plasticizers described herein also may be used in accordance with this invention. In a particularly preferred version, the fatty acid ester is an alkyl oleate selected from the group consisting of methyl, propyl, ethyl, butyl, octyl, and decyl oleates. For example, in one version, ethyl oleate is used as the plasticizer. In another version, butyl oleate or octyl oleate is used in the composition. Preferably, the plasticizer is 2-ethyl hexyl oleate.

Glycerol-based esters such as soy-bean, tung, or linseed oils or their epoxidized derivatives or blends thereof can also be used as plasticizers in the present invention, as can polymeric polyester plasticizers formed from the esterification reaction of diacids and diglycols as well as from the ring-opening polymerization reaction of caprolactones with diacids or diglycols. Citrate esters and acetylated citrate esters are also suitable. Glycerol mono-, di-, and tri-oleates may be used per this invention, and in one preferred embodiment, glycerol trioleate is used as the plasticizer.

Dicarboxylic acid molecules containing both a carboxylic acid ester and a carboxylic acid salt can perform suitably as plasticizers. The magnesium salt of mono-methyl adipate and the zinc salt of mono-octyl glutarate are two such examples for this invention. Tri- and tetra-carboxylic acid esters and salts can also be used.

Also envisioned as suitable plasticizers are organophosphate and organosulfur compounds such as tricresyl phosphate, tributyl phosphate, octyldiphenyl phosphate, alkyl sulfonic acid phenyl esters; and blends thereof; and sulfonamides such as N-ethyl toluene sulfonamide,N-(2-hydroxypropyl)benzene sulfonamide, N-(n-butyl)benzene sulfonamide. Furthermore, thioester and thioether variants of the plasticizer compounds mentioned above are suitable.

Non-ester plasticizers such as alcohols, polyhydric alcohols, glycols, polyglycols, and polyethers also are suitable materials for plasticization. Materials such as polytetramethylene ether glycol, poly(ethylene glycol), and poly(propylene glycol), oleyl alcohol, and cetyl alcohol can be used. Hydrocarbon compounds, both saturated and unsaturated, linear or cyclic can be used such as mineral oils, microcrystalline waxes, or low-molecular weight polybutadiene. Halogenated hydrocarbon compounds can also be used.

Other examples of plasticizers that may be used in the ethylene acid copolymer composition of this invention include butylbenzenesulphonamide, ethylhexyl para-hydroxybenzoate and decylhexyl para-hydroxybenzoate.

Esters and alkylamides such as phthalic acid esters including dimethyl phthalate, diethyl phthalate, dibutyl phthalate, diheptyl phthalate, di-2-ethylhexyl phthalate, di-n-octyl phthalate, diisodecyl phthalate, ditridecyl phthalate, dicyclohexyl phthalate, butylbenzyl phthalate, diisononyl phthalate, ethylphthalylethyl glycolate, butylphthalylbutyl glycolate, diundecyl phthalate, and di-2-ethylhexyl tetrahydrophthalate, also may be used.

Sulphonamides such as N-butylbenzenesulphonamide, ethyltoluene-sulphonamide, N-cyclohexyltoluenesulphonamide, 2-ethylhexyl-para-hydroxybenzoate, 2-decylhexyl-para-hydroxybenzoate, oligoethyleneoxytetrahydrofurfuryl alcohol, or oligoethyleneoxy malonate; esters of hydroxybenzoic acid; esters or ethers of tetrahydrofurfuryl alcohol, and esters of citric acid or hydroxymalonic acid; and these plasticizers are also suitable.

Sulfonamides also may be used in the present invention. Examples of such sulfonamides include N-alkyl benzenesulfonamides and toluenesufonamides, particularly N-butylbenzenesulfonamide, N-(2-hydroxypropyl)benzenesulfonamide, N-ethyl-o-toluenesulfonamide, N-ethyl-p-toluenesulfonamide, o-toluenesulfonamide, p-toluenesulfonamide.

SYLFAT® FA2 is particularly preferred and is a tall oil fatty acid, commercially available from Arizona Chemical, as is VAMAC® G, a terpolymer of ethylene, methylacrylate and a cure site monomer, commercially available from Dupont.

As noted above, fatty acid esters are particularly preferred plasticizers in the present invention. It has been found that the fatty acid esters perform well as plasticizers in the ethylene acid copolymer composition. The fatty acid esters have several advantageous properties. For example, the fatty acid esters are compatible with the ethylene acid copolymers and they tend to blend uniformly and completely with the acid copolymer. Also, the fatty acid esters tend to improve the resiliency and/or compression of the composition as discussed further below. The ethylene acid copolymer/plasticizer compositions may contain other ingredients that do not materially affect the basic and novel characteristics of the composition. For example, mineral fillers may be added as discussed above. In one particular embodiment, the composition includes an ethylene acid copolymer, cation source sufficient to neutralize at least 80% of the acid groups present in the composition, and plasticizer, particularly a fatty acid ester.

One method of preparing the fatty acid ester involves reacting the fatty acid or mixture of fatty acids with a corresponding alcohol. The alcohol can be any alcohol including, but not limited to, linear, branched, and cyclic alcohols. The fatty acid ester is commonly a methyl, ethyl, propyl, butyl, octyl, or other alkyl ester of a carboxylic acid that contains from 4 to 30 carbon atoms. In the present invention, ethyl, butyl, octyl, and decyl esters and particularly ethyl oleate, butyl oleate, and octyl oleate are preferred fatty acid esters because of their properties. The carboxylic acid may be saturated or unsaturated. Examples of suitable saturated carboxylic acids, that is, carboxylic acids in which the carbon atoms of the alkyl chain are connected by single bonds, include but are not limited to butyric acid; capric acid; lauric acid; myristic acid; palmitic acid; stearic acid; and behenic acid. Examples of suitable unsaturated carboxylic acids, that is, a carboxylic acid in which there is one or more double bonds between the carbon atoms in the alkyl chain, include but are not limited to oleic acid; linoleic acid; linolenic acid; and erucic acid.

As discussed above, the ethylene acid copolymer compositions of this invention contain a plasticizer, which is believed to aid in the reduction of the glass transition temperature (Tg) of the composition. The glass transition temperature is a temperature below which a polymer is relatively brittle and above which it is rubber-like and is typically measured with a differential scanning calorimeter. In addition to lowering the Tg, the plasticizer may also reduce the tan δ in the temperature range above the Tg. A dynamic mechanical analyzer is typically used to measure tan δ. The plasticizer may also reduce the hardness of the composition when compared to the same non-plasticized composition. The effects of adding a plasticizer to the ethylene acid copolymer composition on Tg, flex modulus, hardness, and other physical properties are discussed below.

It is believed that the plasticizer should be added in a sufficient amount to the ethylene acid copolymer composition so there is a substantial change in the stiffness and/or hardness of the ethylene acid copolymer. Thus, although the concentration of plasticizer may be as little as 1 wt % to form some ethylene acid copolymer compositions per this invention, it is preferred that the concentration be relatively greater. For example, it is preferred that the concentration of the plasticizer be at least about 3 wt %. More particularly, it is preferred that the plasticizer be present in an amount of about 10 wt % to about 80 wt %, more preferably about 20 wt % to about 60 wt %, most preferably about 25 wt % to about 50 wt %.

It is also believed that adding the plasticizer to the ethylene acid copolymer helps make the composition softer and more rubbery. Adding the plasticizers to the composition helps decrease the stiffness of the composition. That is, the plasticizer helps lower the flex modulus of the composition. The flex modulus can be determined in accordance with ASTM D790 standard among other testing procedures. Thus, in one embodiment, the first ethylene acid copolymer (containing ethylene acid copolymer only) composition has a first flex modulus value and the second ethylene acid copolymer (containing ethylene acid copolymer and plasticizer) composition has a second flex modulus value, wherein the second flex modulus value is less than the first flex modulus by at least about 1%, more preferably at least about 10%.

The first ethylene acid copolymer (containing ethylene acid copolymer only) composition has a first Tg value and the second ethylene acid copolymer (containing ethylene acid copolymer and plasticizer) composition has a second Tg value. The second Tg value is preferably at least 1° less than the first Tg value; more preferably at least 10° less than the first Tg value.

In addition, introducing the specific plasticizers of this invention into the ethylene acid copolymer composition generally helps to reduce the compression and/or increase the COR of the composition (when molded into a solid sphere and tested) versus a non-plasticized composition (when molded into a solid sphere and tested.) Plasticized ethylene acid copolymer compositions typically show compression values lower, or at most equal to, non-plasticized compositions while the plasticized compositions display COR values that may be higher, or at the least equal to, non-plasticized compositions. This effect is surprising, because in many conventional compositions, the compression of the composition increases as the COR increases. In some instances plasticization of the composition might produce a slight reduction in the COR while at the same time reducing the compression to a greater extent, thereby providing an overall improvement to the compression/COR relationship over the non-plasticized composition.

TABLE I

Examples, HNP Only

| Example | Solid Sphere COR | Solid Sphere Compression | Solid Sphere Shore D Hardness | Solid Sphere Shore C Hardness |
|---|---|---|---|---|
| HPF AD1035* | 0.822 | 63 | 41.7 | 70.0 |
| HPF AD1035 Soft* | 0.782 | 35 | 35.6 | 59.6 |
| HPF 2000* | 0.856 | 91 | 46.1 | 76.5 |

*acid copolymer ionomer resin, available from DuPont

TABLE II

Examples, HNP With Plasticizers

| Example | Solid Sphere COR | Solid Sphere Compression | Solid Sphere Shore D Hardness | Solid Sphere Shore C Hardness |
|---|---|---|---|---|
| HPF 2000 | 0.856 | 91 | 46.1 | 76.5 |
| HPF 2000 with 10% EO | 0.839 | 68 | 37.9 | 68.8 |
| HPF 2000 with 20% EO | 0.810 | 32 | 30.2 | 53.0 |
| HPF 2000 with 30% EO | 0.768 | −12 | 22.7 | 39.4 |

HPF 2000: acid copolymer ionomer resin, available from Dupont
EO: ethyl oleate (plasticizer)

The addition of a fatty acid ester plasticizer (ethyl oleate) to the HNPs makes them faster (i.e., exhibit a higher COR at a given compression or a given hardness) compared to the native polymer (without plasticizer). This allows the creation of materials that are faster and softer than commercially-available polymers. This is very important for golf ball layers, where ball speed (i.e., COR) is needed for distance, but where feel (softness or low compression) is also highly desirable to most golfers. The ability to make a softer, better feeling golf ball that has higher COR than predicted is surprising and highly beneficial.

TABLE III

Acid CoPolymer Compositions

| | E1 | E2 | E3 | E4 | CE1 | CE2 |
|---|---|---|---|---|---|---|
| Composition | | | | | | |
| HPF 2000 | 80 | | | | 100 | |
| Primacor 5980i | | 16.5 | 39.7 | 38.6 | | 18.3 |
| Elvaloy 1335AC | | | | 11 | | |
| Fusabond N525 | | 34.2 | 9.9 | | | 38.1 |
| Oelic Acid | | 33.9 | 33 | 33.1 | | 37.6 |
| Magnesium Hydroxide | | 5.4 | 7.4 | 7.3 | | 6.0 |
| Ethyl Oleate | 20 | 10 | 10 | 10 | | |
| Properties | | | | | | |
| Compression | 32 | 31 | 116 | 116 | 91 | 135 |
| Shore C | 53.0 | 60.2 | 83.7 | 81.5 | 76.5 | 90.2 |
| Shore D | 30.2 | 34.3 | 53.0 | 53.3 | 46.1 | 61.5 |
| CoR at 125 ft/s | 0.81 | 0.783 | 0.876 | 0.866 | 0.856 | 0.873 |

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90° to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2-mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements and is set to record the maximum hardness reading attained for each measurement. The digital durometer must be attached to, and its foot made parallel to, the base of an automatic stand. The weight on the durometer and attack rate conforms to ASTM D-2240.

The direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used. Likewise, the midpoint of a core layer is taken at a point equidistant from the inner surface and outer surface of the layer to be measured, most typically an outer core layer. Also, once one or more core layers surround a layer of interest, the exact midpoint may be difficult to determine, therefore, for the purposes of the present invention, the measurement of "midpoint" hardness of a layer is taken within ±1 mm of the measured midpoint of the layer.

Also, it should be understood that there is a fundamental difference between "material hardness" and the hardness as measured directly on a golf ball. For purposes of the present invention, material hardness is measured according to ASTM D2240 and generally involves measuring the hardness of a flat "slab" or "button" formed of the material. Surface hardness as measured directly on a golf ball (i.e., a spherical surface) can result in a different hardness value. The difference in "surface hardness" and "material hardness" values is due to several factors including, but not limited to, ball construction (i.e., core type, number of cores and/or cover layers, and the like); ball diameter; and the material composition of adjacent layers. It also should be understood that the two measurement techniques are not necessarily linearly related and, therefore, one hardness value cannot easily be correlated to the other. Shore hardness (for example, Shore C or Shore D hardness) was measured according to the test method ASTM D-2240.

The HNP compositions optionally comprise at least one additional copolymer component selected from partially neutralized ionomers and particularly SURLYN® AD 1043, 1092, and 1022 ionomer resins, commercially available from DuPont; ionomers modified with rosins; soft and resilient ethylene copolymers; polyolefins, such as linear, branched, or cyclic, $C_2$-$C_{40}$ olefins, particularly polymers comprising ethylene or propylene copolymerized with one or more $C_2$-$C_{40}$ olefins, $C_3$-$C_{20}$ α-olefins, or $C_3$-$C_{10}$ α-olefins; polyamides; polyesters; polyethers; polycarbonates; polysulfones; polyacetals; polylactones; acrylonitrile-butadiene-styrene resins; polyphenylene oxide; polyphenylene sulfide; styrene-acrylonitrile resins; styrene maleic anhydride; polyimides; aromatic polyketones; grafted and non-grafted metallocene-catalyzed polymers, such as single-site catalyst polymerized polymers, high crystalline acid polymers, cationic ionomers, and combinations thereof.

Other polymer components that may be included in the plasticized HNP composition include, for example, natural and synthetic rubbers, including, but not limited to, ethylene propylene rubber, ethylene propylene diene rubber, styrenic block copolymer rubbers (such as SI, SIS, SB, SBS, SIBS, and the like, where "S" is styrene, "I" is isobutylene, and "B" is butadiene), SEBS, butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber (such as ethylene-alkyl acrylates and ethylene-alkyl methacrylates, and, more specifically, ethylene-ethyl acrylate, ethylene-methyl acrylate, and ethylene-butyl acrylate), chlorinated isoprene rubber, acrylonitrile chlorinated isoprene rubber, and polybutadiene rubber.

The plasticized HNP compositions of the present invention, preferably have a specific gravity of about 0.90 g/cc to 1.00 g/cc, more preferably about 0.95 g/cc to 0.99 g/cc. Any suitable filler, flake, fiber, particle, or the like, of an organic or inorganic material may be added to the HNP compositions to increase or decrease the specific gravity.

In a particular embodiment, the HNP compositions are formed by blending an acid copolymer, a non-acid polymer, a cation source, and a fatty acid or metal salt thereof. The resulting HNP compositions are then combined with a plasticizer. For purposes of the present invention, maleic anhydride modified polymers are defined herein as a non-acid polymer despite having anhydride groups that can ring-open to the acid form during processing of the polymer to form the HNP compositions herein. The maleic anhydride groups are grafted onto a polymer, are present at relatively very low levels, and are not part of the polymer backbone, as is the case with the acid polymers, which are exclusively E/X and E/X/Y copolymers of ethylene and an acid, particularly methacrylic acid and acrylic acid. In a particular aspect of this embodiment, the acid copolymer comprises ethylene-acrylic acid and ethylene-methacrylic acid copolymers. The acid copolymer preferably has an acid content of about 2 wt % to about 30 wt %, more preferably about 10 wt % to about 26 wt %, most preferably about 16 wt % to about 20 wt %.

The present invention is not meant to be limited by a particular order for combining and reacting the acid polymer, non-acid polymer, and cation source. In a particular embodiment, the fatty acid or metal salt thereof is used in an amount such that the fatty acid or metal salt thereof is present in the HNP composition in an amount of about 10 wt % to 60 wt %, more preferably about 20 wt % to about 50 wt %, most preferably about 30 wt % to about 40 wt %, based on the total weight of the HNP composition.

In another particular aspect of this embodiment, the acid copolymer is an ethylene-acrylic acid copolymer having an acid content of 19 wt % or greater, the non-acid polymer is a metallocene-catalyzed ethylene-butene copolymer, optionally modified with maleic anhydride, the cation source is magnesium, and the fatty acid or metal salt thereof is magnesium oleate present in the composition in an amount of 20 to 50 wt %, based on the total weight of the composition. This preferred HNP composition is treated with a plasticizer as described below.

The ethylene acid copolymer may be blended with other materials including, but not limited to, partially- and fully-neutralized ionomers optionally blended with a maleic anhydride-grafted non-ionomeric polymer, graft copolymers of ionomer and polyamide, and the following non-ionomeric polymers, including homopolymers and copolymers thereof, as well as their derivatives that are compatibilized with at least one grafted or copolymerized functional group, such as maleic anhydride, amine, epoxy, isocyanate, hydroxyl, sulfonate, phosphonate, and the like.

In a particular embodiment, the plasticized thermoplastic composition comprises a fully-neutralized ionomer optionally blended with a maleic anhydride-grafted non-ionomeric polymer, polyesters, polyamides, polyethers, and blends of two or more thereof and plasticizer.

The plasticized thermoplastic composition may be treated or admixed with a thermoset diene composition to reduce or prevent flow upon overmolding. Optional treatments may also include the addition of peroxide to the material prior to molding, or a post-molding treatment with, for example, a crosslinking solution, electron beam, gamma radiation, isocyanate or amine solution treatment, or the like. Such treatments may prevent the intermediate layer from melting and flowing or "leaking" out at the mold equator, as the thermoset outer core layer is molded thereon at a temperature necessary to crosslink the outer core layer, which is typically from 280° F. to 360° F. for a period of about 5 to 30 min.

The plasticized HNP compositions of the present invention, optionally, include additives and/or fillers in an amount of about 5 wt % to about 50 wt %, more preferably about 10 wt % to about 30 wt %, and most preferably about 15 wt % to about 25 wt %, based on the total weight of the composition. Suitable additives and fillers include, but are not limited to, chemical blowing and foaming agents, optical brighteners, coloring agents, fluorescent agents, whitening agents, UV absorbers, light stabilizers, defoaming agents, processing aids, mica, talc, nano-fillers, antioxidants, stabilizers, softening agents, fragrance components, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, clay, tungsten, tungsten carbide, silica, lead silicate, regrind (recycled material), and mixtures thereof.

In one preferred embodiment, the core and/or core layers of the invention are formed from a thermoplastic, plasticized composition that includes an acid copolymer of ethylene and an α,β-unsaturated carboxylic acid; an optional softening monomer, such as alkyl acrylate or alkyl methacrylate; a plasticizer; and a cation source present in an amount sufficient to neutralize about 0% to 100% of all acid groups present in the plasticized composition. Additionally, an optional organic acid or sat thereof may also be present to effect some or all of the neutralization.

The cores (and, preferably the inner core layer) may also be formed from (or contain as part of a blend) thermoplastic non-ionomer resins. These polymers typically have a hardness in the range of 20 Shore D to 70 Shore D. Examples of thermoplastic non-ionomers include, but are not limited to, ethylene-ethyl acrylate, ethylene-methyl acrylate, ethylene-vinyl acetate, low density polyethylene, linear low density polyethylene, metallocene catalyzed polyolefins, polyamides including nylon copolymers and nylon-ionomer graft copolymers, non-ionomeric acid copolymers, and a variety of thermoplastic elastomers, including styrene-butadiene-styrene block copolymers, thermoplastic block polyamides, polyurethanes, polyureas, thermoplastic block polyesters, functionalized (e.g., maleic anhydride modified) EPR and EPDM, and syndiotactic butadiene resin.

In order to obtain the desired Shore D hardness, it may be necessary to add one or more crosslinking monomers and/or reinforcing agents to the polymer composition. Nonlimiting examples of crosslinking monomers are zinc diacrylate, zinc dimethacrylate, ethylene dimethacrylate, trimethylol propane triacrylate. If crosslinking monomers are used, they typically are added in an amount of 3 to 40 parts (by weight based upon 100 parts by weight of polymer), and more preferably 5 to 30 parts.

Other layers of a dual core, preferably the outer core layer, may be formed from a rubber-based composition treated to define a shallow "positive" hardness gradient, and preferably the inner core layer is formed from the thermoplastic material of the invention and has a "positive" or preferably "negative" hardness gradient. For example, the inner core may be formed from the 'hardness gradient' thermoplastic material of the invention and the outer core layer may include the rubber composition (or vice versa). A base thermoset rubber, which can be blended with other rubbers and polymers, typically includes a natural or synthetic rubber. A preferred base rubber is 1,4-polybutadiene having a cis structure of at least 40%, preferably greater than 80%, and more preferably greater than 90%. Other suitable thermoset rubbers and preferred properties, such as Mooney viscosity, are disclosed in U.S. Pat. No. 7,351,165, filed Mar. 13, 2007, and U.S. Pat. No. 7,458,905, filed Mar. 23, 2007, both of which are incorporated herein by reference.

Other thermoplastic elastomers may be used to modify the properties of the thermoplastic materials of the invention by blending with the base thermoplastic material. These TPEs include natural or synthetic balata, or high trans-polyisoprene, high trans-polybutadiene, or any styrenic block copolymer, such as styrene ethylene butadiene styrene, styrene-isoprene-styrene, etc., a metallocene or other single-site catalyzed polyolefin such as ethylene-octene, or ethylene-butene, or thermoplastic polyurethanes (TPU), including copolymers, e.g. with silicone. Other suitable TPEs include PEBAX®, which is believed to comprise polyether amide copolymers, HYTREL®, which is believed to comprise polyether ester copolymers, thermoplastic urethane, and KRATON®, which is believed to comprise styrenic block copolymers elastomers. Any of the TPEs or TPUs above may also contain functionality suitable for grafting, including maleic acid or maleic anhydride.

Additional polymers may also optionally be incorporated into the inventive cores. Examples include, but are not limited to, thermoset elastomers such as core regrind, thermoplastic vulcanizate, copolymeric ionomer, terpolymeric ionomer, polycarbonate, polyamide, copolymeric polyamide, polyesters, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, styrene-acrylonitrile polymer (SAN) (including olefin-modified SAN and acrylonitrile-styrene-acrylonitrile polymer), styrene-maleic anhydride copolymer, styrenic copolymer, functionalized styrenic copolymer, functionalized styrenic terpolymer, styrenic terpolymer, cellulose polymer, liquid crystal polymer, ethylene-vinyl acetate copolymers, polyurea, and polysiloxane or any metallocene-catalyzed polymers of these species.

Suitable polyamides for use as an additional polymeric material in compositions within the scope of the present invention also include resins obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, or decamethylenediamine, 1,4-cyclohexanediamine, or m-xylylenediamine; (2) a ring-opening polymerization of cyclic lactam, such as ε-caprolactam or Ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine. Specific examples of suitable polyamides include NYLON 6, NYLON 66, NYLON 610, NYLON 11, NYLON 12, copolymerized NYLON, NYLON MXD6 (m-xylylene diamine/adipic acid), and NYLON 46.

Modifications in thermoplastic polymeric structure to create the hardness gradient can be induced by a number of methods, including exposing the TP material to high-energy radiation or through a chemical process using peroxide. Radiative sources include, but are not limited to, gamma rays, electrons, neutrons, protons, x-rays, helium nuclei, or the like. Gamma radiation, typically using radioactive cobalt atoms, is a preferred method for the inventive TP gradient cores because this type of radiation allows for considerable depth of treatment, if necessary. For cores requiring lower depth of penetration, such as when a small gradient is desired, electron-beam accelerators or UV and IR light sources can be used. Useful UV and IR irradiation methods are disclosed in U.S. Pat. Nos. 6,855,070 and 7,198,576, which are incorporated herein by reference thereto. The cores of the invention are typically irradiated at dosages greater than 0.05 Mrd, preferably ranging from 1 Mrd to 20 Mrd, more preferably from 2 Mrd to 15 Mrd, and most preferably from 4 Mrd to 10 Mrd. In one preferred embodiment, the cores are irradiated at a dosage from 5 Mrd to 8 Mrd and in another preferred embodiment, the cores are irradiated with a dosage from 0.05 Mrd to 3 Mrd, more preferably 0.05 Mrd to 1.5 Mrd. In these preferred embodiments, is also desirable to irradiate the cores for a longer time due to the low dosage and in an effort to create a larger TP hardness gradient, either positive or negative, preferably negative.

While a number of methods known in the art are suitable for irradiating the TP (or TS) materials/cores, typically the cores are placed on and slowly move along a channel. Radiation from a radiation source, such as gamma rays, is allowed to contact the surface of the cores. The source is positioned to provide a generally uniform dose of radiation to the cores as they roll along the channel. The speed of the cores as they pass through the radiation source is easily controlled to ensure the cores receive sufficient dosage to create the desired hardness gradient. The cores are irradiated with a dosage of 1 or more Mrd, more preferably 2 Mrd to 15 Mrd. The intensity of the dosage is typically in the range of 1 MeV to 20 MeV.

For thermoplastic resins having a reactive group (e.g., ionomer, thermoplastic urethane, etc.), treating the thermoplastic core in a chemical solution of an isocyanate or and amine affects crosslinking and provide a harder surface and subsequent hardness gradient. Incorporation of peroxide or other free-radical initiator in the thermoplastic polymer, prior to molding or forming, also allows for heat curing on the molded core/core layer to create the desired gradient. By proper selection of time/temperature, an annealing process can be used to create a gradient. Suitable annealing and/or peroxide (free radical) methods are such as disclosed in U.S. Pat. Nos. 5,274,041 and 5,356,941, respectively, which are incorporated by reference thereto. Additionally, silane or amino-silane crosslinking may also be employed as disclosed in U.S. Pat. No. 7,279,529, filed Jun. 7, 2004, and incorporated herein by reference.

The inventive cores (or core layers) may be chemically treated in a solution, such as a solution containing one or more isocyanates, to form the desired hardness gradient. The cores are typically exposed to the solution containing the isocyanate by immersing them in a bath at a particular temperature for a given time. Exposure time should be greater than 1 minute, preferably from 1 minute to 120 minutes, more preferably 5 minutes to 90 minutes, and most preferably 10 minutes to 60 minutes. In one preferred embodiment, the cores are immersed in the treating solution from 15 minutes to 45 minutes, more preferably from 20 minutes to 40 minutes, and most preferably from 25 minutes to 30 minutes.

Preferred isocyanates include aliphatic or aromatic isocyanates, such as HDI, IPDI, MDI, TDI, or diisocyanate or blends thereof known in the art. The isocyanate or diisocyanate used may have a solids content in the range of 1 wt % to 100 wt % solids, preferably 5 wt % to 50 wt % solids, most preferably 10 wt % to 30 wt % solids. In a most preferred embodiment, the cores of the invention are immersed in a solution of MDI (such as Mondur ML™, commercially available from Bayer) at 15 wt % to 30 wt % solids in ketone for 20 minutes to 30 minutes. Suitable solvents (i.e., those that will allow penetration of the isocyanate into the TP material) may be used. Preferred solvents include ketone and acetate. After immersion, the balls are typically air-dried and/or heated. Suitable isocyanates and treatment methods are disclosed in U.S. Pat. No. 7,118,496, which is incorporated herein by reference thereto.

Preferred silanes include, but are not limited to, compounds having the formula:

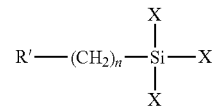

wherein R' is a non-hydrolysable organofunctional group, X is a hydrolysable group, and n is 0-24. The non-hydrolysable organofunctional group typically can link (either by forming a covalent or by another binding mechanism, such as hydrogen bond) to a polymer, such as a polyolefin, thereby attaching the silane to the polymer. R' is preferably a vinyl group. X is preferably alkoxy, acyloxy, halogen, amino, hydrogen, ketoximate group, amido group, aminooxy, mercapto, alkenyloxy group, and the like. Preferably, X is an alkoxy, RO—, wherein R is selected from the group consisting of a linear or branched $C_1$-$C_8$ alkyl group, a $C_6$-$C_{12}$ aromatic group, and $R^3C(O)$—, wherein $R^3$ is a linear or branched $C_1$-$C_8$ alkyl group. Typically, the silane can be linked to the polymer in one of two ways: by reaction of the silane to the finished polymer or copolymerizing the silane with the polymer precursors.

A preferred silane may also have the formula R'—$(CH_2)_n$SiX$_k$Q$_m$ or [R'—$(CH_2)_n$]$_2$Si(X)$_p$Q$_q$, wherein R' is an unsaturated vinyl group; Q is selected from the group consisting of an isocyanate functionality, i.e., a monomer, a biuret, or an isocyanurate; a glycidyl, a halo group and —NR$^1$R$^2$, wherein R$^1$ and R$^2$ are each independently selected from the group consisting of H, a linear or branched C$_1$-C$_8$ alkyl group, a linear or branched C$_1$-C$_8$ alkenyl group and a linear or branched C$_1$-C$_8$ alkynyl group; X is a hydrolysable group; and n is 0-24, k is 1-3, m is 3-n, p is 1-2 and q is 2-p. X is preferably alkoxy, acyloxy, halogen, amino, hydrogen, ketoximate group, amido group, aminooxy, mercapto, alkenyloxy group, and the like. Preferably, the halo group is fluoro, chloro, bromo or iodo and is preferably chloro.

The unsaturated group A is represented by the formula:

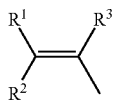

wherein R$^1$, R$^2$, and R$^3$ are each independently selected from the group consisting of a substituted or unsubstituted linear or branched C$_1$-C$_8$ alkyl group, a substituted or unsubstituted C$_6$-C$_{12}$ aromatic group and a halo group. Preferred halo groups include F, Cl or Br. The C$_1$-C$_8$ alkyl groups and the C$_6$-C$_{12}$ aromatic groups may be substituted with one or more C$_1$-C$_6$ alkyl groups, halo groups, such as F, Cl and Br, amines, CN, C$_1$-C$_6$ alkoxy groups, trihalomethane, such as CF$_3$ or CCl$_3$, or mixtures thereof. Preferably, R$^1$, R$^2$, and R$^3$ are each independently selected from the group consisting of hydrogen, methyl, ethyl, n-propyl, isopropyl, n-butyl, isobutyl and tert-butyl. More preferably, R$^1$, R$^2$, and R$^3$ are each independently hydrogen or methyl.

Thus in a preferred embodiment, the silane is a vinyltrialkoxysilane, such as vinyltrimethoxysilane, vinyldimethoxysilane, vinyltrimethoxysilane, vinylmethoxysilane, vinyltriethoxysilane, vinyldiphenylchlorosilane, vinyltrichlorosilane, vinylsilane, (vinyl)(methyl)diethoxysilane, vinyltriacetoxysilane, vinyltris(2-methoxyethoxy)silane, vinyl triphenylsilane, and (vinyl)(dimethyl)chlorosilane.

The silanes of the present invention are present from about 0.1 weight percent to about 100 weight percent of the polyolefin. Typically, the silanes are present from about 0.5 weight percent to about 50 weight percent of the polyolefin, preferably from about 1 weight percent to about 20 weight percent of the polyolefin, more preferably from about 2 weight percent to about 10 weight percent of polyolefin and even more preferably from about 3 weight percent to about 5 weight percent. As used herein, all upper and lower limits of the ranges disclosed herein can be interchanged to form new ranges. Thus, the present invention also encompasses silane amounts of from about 0.1 weight percent to about 5 weight percent of polyolefin, from about 1 weight percent to about 10 weight percent of polyolefin, and even from 20 weight percent to about 50 weight percent.

Commercially available silanes for moisture crosslinking may be used to form golf ball components and golf balls. A nonlimiting example of a suitable silane is SILCAT® RHS Silane, a multi-component crosslinking system for use in moisture crosslinking of stabilized polyethylene or ethylene copolymers (available at Crompton Corporation, Middlebury, Conn.). IN addition, functionalized resin systems also may be used, such as SYNCURE®, which is a silane-grafted, moisture-crosslinkable polyethylene system available from PolyOne Corporation of Cleveland, Ohio, POLIDAN®, which is a silane-crosslinkable HDPE available from Solvay of Padanaplast, Italy, and VISICO™/AMBI-CAT™, which is a polyethylene system that utilizes a non-tin catalyst in crosslinking available from Borealis of Denmark.

Other suitable silanes include, but are not limited to, silane esters, such as octyltriethoxysilane, methyltriethoxylsilane, methyltrimethoxysilane, and proprietary nonionic silane dispersing agent; vinyl silanes, such as proprietary, vinyltriethoxysilane, vinyltrimethoxysilane, vinyl-tris-(2-methoxyethoxy)silane, vinylmethyldimethoxysilane; methacryloxy silanes, such as γ-methacryloxypropyltrimethoxysilane; epoxy silanes, such as β-(3,4-epoxycyclohexyl) ethyltrimethoxysilane, γ-glycidoxypropyltrimethoxysilane; sulfur silanes, such as gamma-mercaptopropyltrimethoxysilane proprietary polysulfidesilane, bis-(3-[triethoxisily]-propyl)-tetrasulfane; amino silanes, such as γ-aminopropyltriethoxysilane, γ-aminopropyltriethoxysilane, γ-aminopropyltriethoxysilane, aminoalkyl silicone solution, modified aminoorganosilane, gamma-aminopropyltrimethoxysilane, n-β-(aminoethyl)-γ-aminopropyltrimethoxysilane, modified aminoorganosilane (40% in methanol), modified aminosilane (50% in methanol), tri-aminofunctional silane, bis-(γ-trimethoxysilylpropyl)amine, n-phenyl-γ-aminopropyltrimethoxysilane, organomodified polydimethylsiloxane, polyazamide silane (50% in methanol), n-β-(aminoethyl)-γ-aminopropylmethyldimethoxysilane; ureido silanes, such as gamma-ureidopropyltrialkoxysilane (50% in methanol), γ-ureidopropyltrimethoxysilane; isocyanate silanes, such as γ-isocyanatopropyltriethoxysilane; and mixtures thereof. Preferably, the silane is an amino silane and more preferably, the amino silane is bis-(γ-trimethoxysilylpropyl)amine.

Both irradiative and chemical methods promote molecular bonding, or cross-links, within the TP polymer. Radiative methods permit cross-linking and grafting in situ on finished products and cross-linking occurs at lower temperatures with radiation than with chemical processing. Chemical methods depend on the particular polymer, the presence of modifying agents, and variables in processing, such as the level of irradiation. Significant property benefits in the TP cores can be attained and include, but are not limited to, improved thermomechanical properties; lower permeability and improved chemical resistance; reduced stress cracking; and overall improvement in physical toughness.

Additional embodiments involve the use of plasticizers to treat the molded core/layer thereby creating a softer outer portion of the core for a "negative" hardness gradient. The plasticizer may be reactive (such as higher alkyl acrylates) or non-reactive (i.e., phthalates, dioctylphthalate, or stearamides, etc). Other suitable plasticizers include, but are not limited to, oxa acids, fatty amines, fatty amides, fatty acid esters, phthalates, adipates, and sebacates. Oxa acids are preferred plasticizers, more preferably those having at least one or two acid functional groups and a variety of different chain lengths. Preferred oxa acids include 3,6-dioxaheptanoic acid, 3,6,9-trioxadecanoic acid, diglycolic acid, 3,6,9-trioxaundecanoic acid, polyglycol diacid, and 3,6-dioxaoctanedioic acid, such as those commercially available from Archimica of Wilmington, Del. Oleic acid esters are particularly preferred and include, but are not limited to, methyl oleate, ethyl oleate, butyl oleate, 2-ethylhexyl oleate, and so forth.

Any means of chemical degradation will also give the desired "negative" hardness gradient. Chemical modifications such as esterification or saponification are also suitable for modification of the thermoplastic core/layer surface.

Fillers may also be added to the thermoplastic materials of the core to adjust the density of the material up or down.

The shallow "positive" hardness gradient outer core layer(s) are formed from a composition including at least one thermoset base rubber, such as a polybutadiene rubber, cured with at least one peroxide and at least one reactive co-agent, which can be a metal salt of an unsaturated carboxylic acid, such as acrylic acid or methacrylic acid, a non-metallic coagent, or mixtures thereof. Preferably, for the "negative" hardness gradient core embodiment, a suitable antioxidant is included in the composition. An optional soft and fast agent (and sometimes a cis-to-trans catalyst), such as an organosulfur or metal-containing organosulfur compound, can also be included in the core formulation.

Other ingredients that are known to those skilled in the art may be used, and are understood to include, but not be limited to, density-adjusting fillers, process aides, plasticizers, blowing or foaming agents, sulfur accelerators, and/or non-peroxide radical sources.

The base thermoset rubber, which can be blended with other rubbers and polymers, typically includes a natural or synthetic rubber. A preferred base rubber is 1,4-polybutadiene having a cis structure of at least 40%, preferably greater than 80%, and more preferably greater than 90%.

Examples of desirable polybutadiene rubbers include and TAKTENE® 1203G1, 220, 221, BUNA® CB22 and BUNA® CB23, commercially available from LANXESS Corporation; UBEPOL® 360L and UBEPOL® 150L and UBEPOL-BR rubbers, commercially available from UBE Industries, Ltd. of Tokyo, Japan; KINEX® 7245 and KINEX® 7265, commercially available from Goodyear of Akron, Ohio; SE BR-1220, commercially available from Dow Chemical Company; Europrene® NEOCIS® BR 40 and BR 60, commercially available from Polimeri Europa; and BR 01, BR 730, BR 735, BR 11, and BR 51, commercially available from Japan Synthetic Rubber Co., Ltd; COPERFLEX® BRNd-40 from Petroflex of Brazil; and KARBOCHEM® ND40, ND45, and ND60, commercially available from Karbochem.

The base rubber may also comprise high or medium Mooney viscosity rubber, or blends thereof. The measurement of Mooney viscosity is defined according to ASTM D-1646. The Mooney viscosity range is preferably greater than about 40, more preferably in the range from about 40 to about 80 and more preferably in the range from about 40 to about 60. Polybutadiene rubber with higher Mooney viscosity may also be used, so long as the viscosity of the polybutadiene does not reach a level where the high viscosity polybutadiene clogs or otherwise adversely interferes with the manufacturing machinery. It is contemplated that polybutadiene with viscosity less than 65 Mooney can be used with the present invention. In one embodiment of the present invention, golf ball core layers made with mid- to high-Mooney viscosity polybutadiene material exhibit increased resiliency (and, therefore, distance) without increasing the hardness of the ball.

Commercial sources of suitable mid- to high-Mooney viscosity polybutadiene include Bayer AG CB23 (Nd-catalyzed), which has a Mooney viscosity of around 50 and is a highly linear polybutadiene, and Dow 1220 (Co-catalyzed). If desired, the polybutadiene can also be mixed with other elastomers known in the art, such as other polybutadiene rubbers, natural rubber, styrene butadiene rubber, and/or isoprene rubber in order to further modify the properties of the core. When a mixture of elastomers is used, the amounts of other constituents in the core composition are typically based on 100 parts by weight of the total elastomer mixture.

In one preferred embodiment, the base rubber comprises a Nd-catalyzed polybutadiene, a rare earth-catalyzed polybutadiene rubber, or blends thereof. If desired, the polybutadiene can also be mixed with other elastomers known in the art such as natural rubber, polyisoprene rubber and/or styrene-butadiene rubber in order to modify the properties of the core. Other suitable base rubbers include thermosetting materials such as, ethylene propylene diene monomer rubber, ethylene propylene rubber, butyl rubber, halobutyl rubber, hydrogenated nitrile butadiene rubber, nitrile rubber, and silicone rubber.

Thermoplastic elastomers (TPE) many also be used to modify the properties of the core layers, or the uncured core layer stock by blending with the base thermoset rubber. These TPEs include natural or synthetic balata, or high trans-polyisoprene, high trans-polybutadiene, or any styrenic block copolymer, such as styrene ethylene butadiene styrene, styrene-isoprene-styrene, etc., a metallocene or other single-site catalyzed polyolefin such as ethylene-octene, or ethylene-butene, or thermoplastic polyurethanes (TPU), including copolymers, e.g. with silicone. Other suitable TPEs for blending with the thermoset rubbers of the present invention include PEBAX®, which is believed to comprise polyether amide copolymers, HYTREL®, which is believed to comprise polyether ester copolymers, thermoplastic urethane, and KRATON®, which is believed to comprise styrenic block copolymers elastomers. Any of the TPEs or TPUs above may also contain functionality suitable for grafting, including maleic acid or maleic anhydride.

Additional polymers may also optionally be incorporated into the base rubber. Examples include, but are not limited to, thermoset elastomers such as core regrind, thermoplastic vulcanizate, copolymeric ionomer, terpolymeric ionomer, polycarbonate, polyamide, copolymeric polyamide, polyesters, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, styrene-acrylonitrile polymer (SAN) (including olefin-modified SAN and acrylonitrile-styrene-acrylonitrile polymer), styrene-maleic anhydride copolymer, styrenic copolymer, functionalized styrenic copolymer, functionalized styrenic terpolymer, styrenic terpolymer, cellulose polymer, liquid crystal polymer, ethylene-vinyl acetate copolymers, polyurea, and polysiloxane or any metallocene-catalyzed polymers of these species.

Suitable polyamides for use as an additional polymeric material in compositions within the scope of the present invention also include resins obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, or decamethylenediamine, 1,4-cyclohexanediamine, or m-xylylenediamine; (2) a ring-opening polymerization of cyclic lactam, such as ε-caprolactam or Ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine. Specific examples of suitable polyamides include NYLON 6, NYLON 66, NYLON 610, NYLON 11, NYLON 12, copolymerized NYLON, NYLON MXD6, and NYLON 46.

Suitable peroxide initiating agents include dicumyl peroxide; 2,5-dimethyl-2,5-di(t-butylperoxy)hexane; 2,5-dimethyl-2,5-di(t-butylperoxy)hexyne; 2,5-dimethyl-2,5-di (benzoylperoxy)hexane; 2,2'-bis(t-butylperoxy)-di-isopropylbenzene; 1,1-bis(t-butylperoxy)-3,3,5-trimethyl cyclohexane; n-butyl 4,4-bis(t-butyl-peroxy)valerate; t-butyl perbenzoate; benzoyl peroxide; n-butyl 4,4'-bis(butylperoxy) valerate; di-t-butyl peroxide; or 2,5-di-(t-butylperoxy)-2,5-dimethyl hexane, lauryl peroxide, t-butyl hydroperoxide, α-α bis(t-butylperoxy)diisopropylbenzene, di(2-t-butyl-peroxyisopropyl)benzene, di-t-amyl peroxide, di-t-butyl peroxide. Preferably, the rubber composition includes from about 0.25 to about 5.0 parts by weight peroxide per 100 parts by weight rubber (phr), more preferably 0.5 phr to 3 phr, most preferably 0.5 phr to 1.5 phr. In a most preferred embodiment, the peroxide is present in an amount of about 0.8 phr. These ranges of peroxide are given assuming the peroxide is 100% active, without accounting for any carrier that might be present. Because many commercially available peroxides are sold along with a carrier compound, the actual amount of active peroxide present must be calculated. Commercially-available peroxide initiating agents include DICUP™ family of dicumyl peroxides (including DICUP™ R, DICUP™ 40C and DICUP™ 440KE) available from Crompton (Geo Specialty Chemicals). Similar initiating agents are available from AkroChem, Lanxess, Flexsys/Harwick and R.T. Vanderbilt. Another commercially-available and preferred initiating agent is TRIGONOX™ 265-50B from Akzo Nobel, which is a mixture of 1,1-di(t-butylperoxy)-3,3,5-trimethylcyclohexane and di(2-t-butylperoxyisopropyl)benzene. TRIGONOX™ peroxides are generally sold on a carrier compound.

Suitable reactive co-agents include, but are not limited to, metal salts of diacrylates, dimethacrylates, and monomethacrylates suitable for use in this invention include those wherein the metal is zinc, magnesium, calcium, barium, tin, aluminum, lithium, sodium, potassium, iron, zirconium, and bismuth. Zinc diacrylate (ZDA) is preferred, but the present invention is not limited thereto. ZDA provides golf balls with a high initial velocity. The ZDA can be of various grades of purity. For the purposes of this invention, the lower the quantity of zinc stearate present in the ZDA the higher the ZDA purity. ZDA containing less than about 10% zinc stearate is preferable. More preferable is ZDA containing about 4-8% zinc stearate. Suitable, commercially available zinc diacrylates include those from Sartomer Co. The preferred concentrations of ZDA that can be used are about 10 phr to about 55 phr, preferably 10 phr to about 40 phr, alternatively about 15 phr to about 40 phr, more preferably 20 phr to about 35 phr, most preferably 25 phr to about 35 phr. In a particularly preferred embodiment, the reactive co-agent is present in an amount of about 21 phr to 31 phr, preferably about 29 phr to about 31 phr.

Additional preferred co-agents that may be used alone or in combination with those mentioned above include, but are not limited to, trimethylolpropane trimethacrylate, trimethylolpropane triacrylate, and the like. It is understood by those skilled in the art, that in the case where these co-agents may be liquids at room temperature, it may be advantageous to disperse these compounds on a suitable carrier to promote ease of incorporation in the rubber mixture.

Antioxidants are compounds that inhibit or prevent the oxidative breakdown of elastomers, and/or inhibit or prevent reactions that are promoted by oxygen radicals. Some exemplary antioxidants that may be used in the present invention include, but are not limited to, quinoline type antioxidants, amine type antioxidants, and phenolic type antioxidants. A preferred antioxidant is 2,2'-methylene-bis-(4-methyl-6-t-butylphenol) available as VANOX® MBPC from R.T. Vanderbilt. Other polyphenolic antioxidants include VANOX® T, VANOX® L, VANOX® SKT, VANOX® SWP, VANOX® 13 and VANOX® 1290.

Preferably, about 0.25 phr to about 1.5 phr of peroxide as calculated at 100% active can be added to the core formulation, more preferably about 0.5 phr to about 1.2 phr, and most preferably about 0.7 phr to about 1.0 phr. The ZDA amount can be varied to suit the desired compression, spin and feel of the resulting golf ball. The cure regime can have a temperature range between from about 290° F. to about 335° F., more preferably about 300° F. to about 325° F., and the stock is held at that temperature for at least about 10 minutes to about 30 minutes.

If a steep "positive" hardness gradient is desired across any rubber layer, a gradient-promoting additive (GPA) should be present. Suitable GPA's include, but are not limited to benzoquinones, resorcinols, catechols, quinhydrones, and hydroquinones. Those, and other methods and material for creating a steep "positive" hardness gradient are disclosed in U.S. patent application Ser. Nos. 12/168,979; 12/168,987; 12/168,995; and 12/169,002, which are incorporated herein by reference thereto.

The thermoset rubber composition of the present invention may also include an optional soft and fast agent. As used herein, "soft and fast agent" means any compound or a blend thereof that that is capable of making a core 1) be softer (lower compression) at constant COR or 2) have a higher COR at equal compression, or any combination thereof, when compared to a core equivalently prepared without a soft and fast agent. Preferably, the composition of the present invention contains from about 0.05 phr to about 10.0 phr soft and fast agent. In one embodiment, the soft and fast agent is present in an amount of about 0.05 phr to about 3.0 phr, preferably about 0.05 phr to about 2.0 phr, more preferably about 0.05 phr to about 1.0 phr. In another embodiment, the soft and fast agent is present in an amount of about 2.0 phr to about 5.0 phr, preferably about 2.35 phr to about 4.0 phr, and more preferably about 2.35 phr to about 3.0 phr. In an alternative high concentration embodiment, the soft and fast agent is present in an amount of about 5.0 phr to about 10.0 phr, more preferably about 6.0 phr to about 9.0 phr, most preferably about 7.0 phr to about 8.0 phr. In a most preferred embodiment, the soft and fast agent is present in an amount of about 2.6 phr.

Suitable soft and fast agents include, but are not limited to, organosulfur or metal-containing organosulfur compounds, an organic sulfur compound, including mono, di, and polysulfides, a thiol, or mercapto compound, an inorganic sulfide compound, a Group VIA compound, or mixtures thereof. The soft and fast agent component may also be a blend of an organosulfur compound and an inorganic sulfide compound.

Suitable soft and fast agents of the present invention include, but are not limited to those having the following general formula:

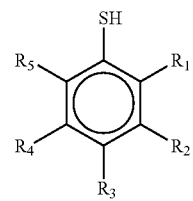

where $R_1$-$R_5$ can be $C_1$-$C_8$ alkyl groups; halogen groups; thiol groups (—SH), carboxylated groups; sulfonated groups; and hydrogen; in any order; and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts. Preferably, the halogenated thiophenol compound is pentachlorothiophenol, which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, Ohio. PCTP is commercially available in neat form from eChinachem of San Francisco, Calif. and in the salt form from eChinachem of San Francisco, Calif. Most preferably, the halogenated thiophenol compound is the zinc salt of pentachlorothiophenol, which is commercially available from eChinachem of San Francisco, Calif.

As used herein when referring to the invention, the term "organosulfur compound(s)" refers to any compound containing carbon, hydrogen, and sulfur, where the sulfur is directly bonded to at least 1 carbon. As used herein, the term "sulfur compound" means a compound that is elemental sulfur, polymeric sulfur, or a combination thereof. It should be further understood that the term "elemental sulfur" refers to the ring structure of $S_8$ and that "polymeric sulfur" is a structure including at least one additional sulfur relative to elemental sulfur.

Additional suitable examples of soft and fast agents (that are also believed to be cis-to-trans catalysts) include, but are not limited to, 4,4'-diphenyl disulfide; 4,4'-ditolyl disulfide; 2,2'-benzamido diphenyl disulfide; bis(2-aminophenyl)disulfide; bis(4-aminophenyl)disulfide; bis(3-aminophenyl)disulfide; 2,2'-bis(4-aminonaphthyl)disulfide; 2,2'-bis(3-aminonaphthyl)disulfide; 2,2'-bis(4-aminonaphthyl)disulfide; 2,2'-bis(5-aminonaphthyl)disulfide; 2,2'-bis(6-aminonaphthyl)disulfide; 2,2'-bis(7-aminonaphthyl)disulfide; 2,2'-bis(8-aminonaphthyl)disulfide; 1,1'-bis(2-aminonaphthyl)disulfide; 1,1'-bis(3-aminonaphthyl)disulfide; 1,1'-bis(3-aminonaphthyl)disulfide; 1,1'-bis(4-aminonaphthyl)disulfide; 1,1'-bis(5-aminonaphthyl)disulfide; 1,1'-bis(6-aminonaphthyl)disulfide; 1,1'-bis(7-aminonaphthyl)disulfide; 1,1'-bis(8-aminonaphthyl)disulfide; 1,2'-diamino-1,2'-dithiodinaphthalene; 2,3'-diamino-1,2'-dithiodinaphthalene; bis(4-chlorophenyl)disulfide; bis(2-chlorophenyl)disulfide; bis(3-chlorophenyl)disulfide; bis(4-bromophenyl)disulfide; bis(2-bromophenyl)disulfide; bis(3-bromophenyl)disulfide; bis(4-fluorophenyl)disulfide; bis(4-iodophenyl)disulfide; bis(2,5-dichlorophenyl)disulfide; bis(3,5-dichlorophenyl)disulfide; bis(2,4-dichlorophenyl)disulfide; bis(2,6-dichlorophenyl)disulfide; bis(2,5-dibromophenyl)disulfide; bis(3,5-dibromophenyl)disulfide; bis(2-chloro-5-bromophenyl)disulfide; bis(2,4,6-trichlorophenyl)disulfide; bis(2,3,4,5,6-pentachlorophenyl)disulfide; bis(4-cyanophenyl)disulfide; bis(2-cyanophenyl)disulfide; bis(4-nitrophenyl)disulfide; bis(2-nitrophenyl)disulfide; 2,2'-dithiobenzoic acid ethylester; 2,2'-dithiobenzoic acid methylester; 2,2'-dithiobenzoic acid; 4,4'-dithiobenzoic acid ethylester; bis(4-acetylphenyl)disulfide; bis(2-acetylphenyl) disulfide; bis(4-formylphenyl)disulfide; bis(4-carbamoylphenyl)disulfide; 1,1'-dinaphthyl disulfide; 2,2'-dinaphthyl disulfide; 1,2'-dinaphthyl disulfide; 2,2'-bis(1-chlorodinaphthyl)disulfide; 2,2'-bis(1-bromonaphthyl)disulfide; 1,1'-bis(2-chloronaphthyl)disulfide; 2,2'-bis(1-cyanonaphthyl)disulfide; 2,2'-bis(1-acetylnaphthyl)disulfide; and the like; or a mixture thereof. Preferred organosulfur components include 4,4'-diphenyl disulfide, 4,4'-ditolyl disulfide, or 2,2'-benzamido diphenyl disulfide, or a mixture thereof. A more preferred organosulfur component includes 4,4'-ditolyl disulfide. In another embodiment, metal-containing organosulfur components can be used according to the invention. Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof.

Suitable substituted or unsubstituted aromatic organic components that do not include sulfur or a metal include, but are not limited to, 4,4'-diphenyl acetylene, azobenzene, or a mixture thereof. The aromatic organic group preferably ranges in size from $C_6$ to $C_{20}$, and more preferably from $C_6$ to $C_{10}$. Suitable inorganic sulfide components include, but are not limited to titanium sulfide, manganese sulfide, and sulfide analogs of iron, calcium, cobalt, molybdenum, tungsten, copper, selenium, yttrium, zinc, tin, and bismuth.

A substituted or unsubstituted aromatic organic compound is also suitable as a soft and fast agent. Suitable substituted or unsubstituted aromatic organic components include, but are not limited to, components having the formula $(R_1)_x$—$R_3$-M-$R_4$—$(R_2)_y$, wherein $R_1$ and $R_2$ are each hydrogen or a substituted or unsubstituted $C_{1-20}$ linear, branched, or cyclic alkyl, alkoxy, or alkylthio group, or a single, multiple, or fused ring $C_6$ to $C_{24}$ aromatic group; x and y are each an integer from 0 to 5; $R_3$ and $R_4$ are each selected from a single, multiple, or fused ring $C_6$ to $C_{24}$ aromatic group; and M includes an azo group or a metal component. $R_3$ and $R_4$ are each preferably selected from a $C_6$ to $C_{10}$ aromatic group, more preferably selected from phenyl, benzyl, naphthyl, benzamido, and benzothiazyl. $R_1$ and $R_2$ are each preferably selected from a substituted or unsubstituted $C_1$ to $C_{10}$ linear, branched, or cyclic alkyl, alkoxy, or alkylthio group or a $C_6$ to $C_{10}$ aromatic group. When $R_1$, $R_2$, $R_3$, or $R_4$, are substituted, the substitution may include one or more of the following substituent groups: hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites. When M is a metal component, it may be any suitable elemental metal available to those of ordinary skill in the art. Typically, the metal will be a transition metal, although preferably it is tellurium or selenium. In one embodiment, the aromatic organic compound is substantially free of metal, while in another embodiment the aromatic organic compound is completely free of metal.

The soft and fast agent can also include a Group VIA component. Elemental sulfur and polymeric sulfur are commercially available from Elastochem, Inc. of Chardon, Ohio. Exemplary sulfur catalyst compounds include PB(RM-S)-80 elemental sulfur and PB(CRST)-65 polymeric sulfur, each of which is available from Elastochem, Inc. An exemplary tellurium catalyst under the tradename TELLOY® and an exemplary selenium catalyst under the tradename VANDEX® are each commercially available from RT Vanderbilt.

Other suitable soft and fast agents include, but are not limited to, hydroquinones, benzoquinones, quinhydrones, catechols, and resorcinols. Suitable compounds include, but are not limited to, those disclosed in U.S. patent application Ser. No. 11/829,461, the disclosure of which is incorporated herein in its entirety by reference thereto.

Fillers may also be added to the thermoset rubber composition of the core to adjust the density of the composition, up or down. Typically, fillers include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, trans-regrind core material (recycled core material containing high trans-isomer of polybutadiene), and the like. When trans-regrind is present, the amount of trans-isomer is preferably between about 10% and about 60%. In a preferred embodiment of the invention, the core comprises polybutadiene having a cis-isomer content of greater than about 95% and trans-regrind core material (already vulcanized) as a filler. Any particle size trans-regrind core material is sufficient, but is preferably less than about 125 µm.

Fillers added to one or more portions of the golf ball typically include processing aids or compounds to affect rheological and mixing properties, density-modifying fillers, tear strength, or reinforcement fillers, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Fillers may include polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

Materials such as tungsten, zinc oxide, barium sulfate, silica, calcium carbonate, zinc carbonate, metals, metal oxides and salts, and regrind (recycled core material typically ground to about 30 mesh particle) are also suitable fillers.

The polybutadiene and/or any other base rubber or elastomer system may also be foamed, or filled with hollow microspheres or with expandable microspheres which expand at a set temperature during the curing process to any low specific gravity level. Other ingredients such as sulfur accelerators, e.g., tetra methylthiuram di, tri, or tetrasulfide, and/or metal-containing organosulfur components may also be used according to the invention. Suitable metal-containing organosulfur accelerators include, but are not limited to, cadmium, copper, lead, and tellurium analogs of diethyldithiocarbamate, diamyldithiocarbamate, and dimethyldithiocarbamate, or mixtures thereof. Other ingredients such as processing aids e.g., fatty acids and/or their metal salts, processing oils, dyes and pigments, as well as other additives known to one skilled in the art may also be used in the present invention in amounts sufficient to achieve the purpose for which they are typically used.

There are a number of preferred embodiments defined by the present invention, which is preferably a golf ball having a "dual core" including a solid thermoplastic inner core layer having a "negative" hardness gradient and a rubber-based outer core layer having a steep (>25 Shore C points) or shallow (<25 Shore C points) "positive" hardness gradient.

Referring to FIG. 1, the center (mid-point) of the thermoplastic inner core layer should have a hardness of at least about 90 Shore C, preferably from about 90 Shore C to about 100 Shore C, more preferably from about 92 Shore C to about 98 Shore C, and most preferably from about 94 Shore C to about 96 Shore C. The outer surface of the inner core layer has a hardness that is greater than the hardness of the center of the inner core layer (to define the "negative" hardness gradient), at least about 85 Shore C, preferably from about 85 Shore C to about 95 Shore C, more preferably from about 87 Shore C to about 93 Shore C, and most preferably about 89 Shore C to about 91 Shore C.

The inner surface of the thermoset rubber outer core layer has a Shore C hardness of about 50 Shore C to about 60 Shore C, preferably about 52 Shore C to about 58 Shore C, more preferably from about 54 Shore C to about 56 Shore C. The outer surface of the outer core layer has a hardness that is substantially greater than the hardness of the inner surface of the outer core layer (to define the steep "positive" hardness gradient), at least about 82 Shore C, preferably about 82 Shore C to about 92 Shore C, more preferably about 84 Shore C to about 90 Shore C, most preferably about 86 Shore C to about 88 Shore C. The gradient should be steep—at least 25 Shore C, preferably 25 Shore C to 45 Shore C, more preferably 25 Shore C to 40 Shore C, and most preferably 30 Shore C to 35 shore C.

The difference in hardness, Δh, between the outer surface of the inner core layer and the inner surface of the outer core layer, should be at least 25 Shore C, preferably 25 Shore C to 45 Shore C, more preferably 25 Shore C to 40 Shore C, and most preferably 30 Shore C to 35 shore C (meaning that the inner surface of the outer core layer is substantially softer than the outer surface of the inner core). In one embodiment, the outer surface of the outer core layer is also softer than the outer surface of the inner core layer, preferably by 1 Shore C to 5 Shore C, more preferably by 1 Shore C to 3 Shore C, and alternatively by 3 Shore C to 5 Shore C.

Figure 2:
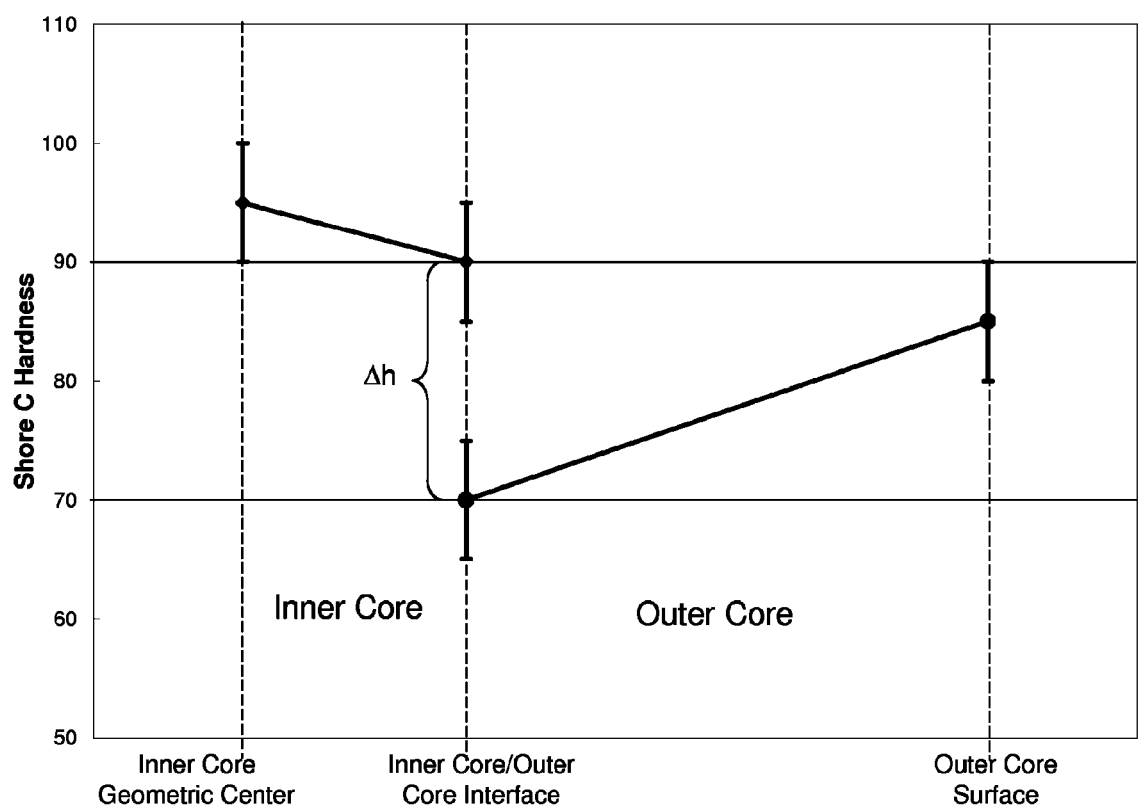
FIG. 2 is a graph showing preferred hardness values and relationships between the "negative" hardness gradient thermoplastic inner core layer and the conventional "positive" hardness gradient thermoset outer core layer of the present invention.

Referring to FIG. 2, the center (mid-point) of the thermoplastic inner core layer should have a hardness of at least about 90 Shore C, preferably from about 90 Shore C to about 100 Shore C, more preferably from about 92 Shore C to about 98 Shore C, and most preferably from about 94 Shore C to about 96 Shore C. The outer surface of the inner core layer has a hardness that is greater than the hardness of the center of the inner core layer (to define the "negative" hardness gradient), at least about 85 Shore C, preferably from about 85 Shore C to about 95 Shore C, more preferably from about 87 Shore C to about 93 Shore C, and most preferably about 89 Shore C to about 91 Shore C.

The inner surface of the thermoset rubber outer core layer has a Shore C hardness of about 65 Shore C to about 75 Shore C, preferably about 67 Shore C to about 73 Shore C, more preferably from about 69 Shore C to about 71 Shore C. The outer surface of the outer core layer has a hardness that is greater than the hardness of the inner surface of the outer core layer (to define the shallow "positive" hardness gradient), at least about 80 Shore C, preferably about 80 Shore C to about 90 Shore C, more preferably about 82 Shore C to about 88 Shore C, most preferably about 84 Shore C to about 86 Shore C. The gradient should be shallow—less than 25

Shore C, preferably less than 20 Shore C, more preferably less than 15 Shore C, and most preferably between 1 and 15 Shore C.

The difference in hardness, Δh, between the outer surface of the inner core layer and the inner surface of the outer core layer, should be less than 25 Shore C, preferably less than 20 Shore C, more preferably less than 15 Shore C, and most preferably between 1 and 15 Shore C (meaning that the inner surface of the outer core layer is softer than the outer surface of the inner core). In one embodiment, the outer surface of the outer core layer is also softer than the outer surface of the inner core layer, preferably by 1 Shore C to 5 Shore C, more preferably by 1 Shore C to 3 Shore C, and alternatively by 3 Shore C to 5 Shore C.

The sloped lines in FIGS. 1 and 2 depict the "direction" of the gradient and are by no means dispositive of the nature of the hardness values between the outer and inner surfaces—while one embodiment certainly is a linearly-sloped hardness gradient for both core layers having the values depicted in the Figures, it should be understood that the interim hardness values are not necessarily linearly related (i.e., they can be dispersed above and/or below the line).

There are a number of alternative embodiments defined by the present invention, which is preferably a golf ball including a single, solid thermoplastic core having a "positive" or "negative" hardness gradient, or a "dual core," in which at least one, preferably both, of the inner core and outer core layer are formed from a thermoplastic material and have a "positive" or "negative" hardness gradient. In one preferred embodiment, a "low spin" embodiment, the inner surface of the outer core layer is harder than the outer surface of the inner core. In a second preferred embodiment, a "high spin" embodiment, the inner surface of the outer core layer is softer than the outer surface of the inner core. The alternative to these embodiments, to form a "positive" hardness gradient, are also preferred.

Figure 3:
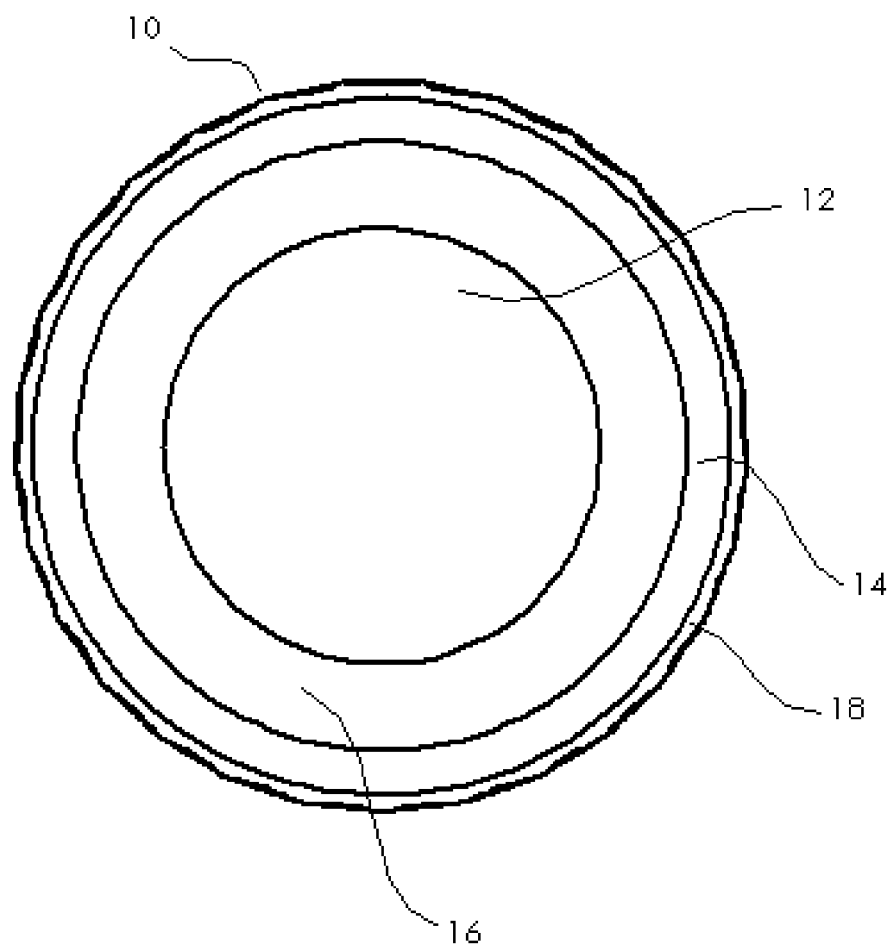
FIG. 3 is one embodiment of a golf ball of the present invention.

Referring to FIG. 3, in one alternative embodiment of the present invention the golf ball 10 includes a thermoplastic inner core 12, outer core layer 16, inner cover layer 14, and outer cover layer 18. The inner core 12 has a positive hardness gradient and the outer core layer 16 has a shallow positive hardness gradient of less than 25 Shore C.

"Positive" hardness gradient embodiments, single solid core: the surface hardness of the core can range from 25 Shore D to 90 Shore D, preferably 45 Shore D to 70 Shore D. The surface hardness is most preferably 68 Shore D, 60 Shore D, or 49 Shore D. The corresponding hardness of the center of the solid core may range from 30 Shore D to 80 Shore D, more preferably 40 Shore D to 65 Shore D, and most preferably 61 Shore D, 52 Shore D, or 43 Shore D, respectively. The "positive" gradient is preferably 7, 8, or 6, respectively. Corresponding Atti compression values may be 135, 110, or 90, respectively. The COR of these cores may range from 0.800 to 0.850, preferably 0.803 to 0.848.

"Positive" hardness gradient embodiments, dual core: the outer core surface hardness may range from 25 Shore D to 90 Shore D, more preferably 45 Shore D to 70 Shore D, and most preferably 68 Shore D, 61 Shore D, or 49 Shore D. The inner surface of the outer core may have a corresponding hardness of 61 Shore D, 61 Shore D, or 43 Shore D, respectively. The surface of the inner core can range from 40 Shore D to 65 Shore D, but is preferably and correspondingly 43 Shore D, 60 Shore D, or 49 Shore D, respectively. The center hardness of the inner core can range from 30 Shore D to 80 Shore D, more preferably 40 Shore D to 55 Shore D, and most preferably 43 Shore D, 50 Shore D, or 43 Shore D, respectively. The "positive" gradient is preferably 25, 11, or 6, respectively. The corresponding compressions are 100, 97, or 92 and COR values are 0.799, 0.832, or 0.801, respectively.

"Negative" hardness gradient embodiments, single solid core: the surface hardness of the core can range from 20 Shore D to 80 Shore D, more preferably 35 Shore D to 60 Shore D. The surface hardness is most preferably 56 Shore D, 45 Shore D, or 40 Shore D. The corresponding center hardness may range from 30 Shore D to 75 Shore D, preferably 40 Shore D to 65 Shore D, and more preferably 61 Shore D, 52 Shore D, or 43 Shore D, respectively. The "negative" gradient is preferably −5, −7, or −3, respectively. Corresponding Atti compression values may be 111, 104, or 85, respectively. The COR of these cores may range from 0.790 to 0.820, preferably 0.795 to 0.812.

"Negative" hardness gradient embodiments, dual core: the outer core surface hardness may range from 20 Shore D to 80 Shore D, preferably 35 Shore D to 55 Shore D, more preferably 45 Shore D, 40 Shore D, or 52 Shore D. The inner surface of the outer core may have a corresponding hardness of 52 Shore D, 43 Shore D, or 52 Shore D, respectively. The surface of the inner core can range from 30 Shore D to 75 Shore D, preferably 50 Shore D to 65 Shore D, more preferably and correspondingly 61 Shore D, 52 Shore D, or 56 Shore D, respectively. The center hardness of the inner core can range from 50 Shore D to 65 Shore D, but is preferably 61 Shore D, 52 Shore D, or 61 Shore D, respectively. The "negative" gradient is steep, preferably −16, −12, or −9, respectively. The corresponding compressions are 117, 92, or 115 and COR values are 0.799, 0.832, or 0.801, respectively.

In a "low spin" embodiment of the present invention, the hardness of the thermoplastic inner core (at any point—surface, center, or otherwise) ranges from 30 Shore C to 80 Shore C, more preferably 40 Shore C to 75 Shore C, most preferably 45 Shore C to 70 Shore C. Concurrently, the hardness of the outer core layer (at any point—surface, inner surface, or otherwise) ranges from 60 Shore C to 95 Shore C, more preferably 60 Shore C to 90 Shore C, most preferably 65 Shore C to 80 Shore C.

In a "high spin" embodiment, the hardness of the thermoplastic inner core ranges from 60 Shore C to 95 Shore C, more preferably 60 Shore C to 90 Shore C, most preferably 65 Shore C to 80 Shore C. Concurrently, the hardness of the outer core layer ranges from 30 Shore C to 80 Shore C, more preferably 40 Shore C to 75 Shore C, most preferably 45 Shore C to 70 Shore C.

In the embodiment where the interface (i.e., the area where the two components meet) of the outer core layer and the inner core has substantially the same hardness, the ranges provided for either the "low spin" or "high spin" embodiments are sufficient, as long as the "negative" hardness gradient is maintained and the hardness value at the inner surface of the outer core layer is roughly the same as the hardness value at the outer surface of the inner core.

The surface hardness of a core is obtained from the average of a number of measurements taken from opposing hemispheres of a core, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface of a core, care must be taken to insure that the core is centered under the durometer indentor before a surface hardness reading is obtained. A calibrated, digital durometer, capable of reading to 0.1 hardness units is used for all hardness measurements and is set to take hardness readings at 1 second after the maximum reading is obtained. The digital durometer must be attached to, and its foot made parallel to, the base of an automatic stand, such that the weight on the durometer and attack rate conform to ASTM D-2240.

To prepare a core for hardness gradient measurements, the core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut, made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' core surface is ground to a smooth, flat surface, revealing the geometric center of the core, which can be verified by measuring the height of the bottom of the holder to the exposed surface of the core, making sure that exactly half of the original height of the core, as measured above, has been removed to within ±0.004 inches.

Leaving the core in the holder, the center of the core is found with a center square and carefully marked and the hardness is measured at the center mark. Hardness measurements at any distance from the center of the core may be measured by drawing a line radially outward from the center mark, and measuring and marking the distance from the center, typically in 2-mm increments. All hardness measurements performed on the plane passing through the geometric center are performed while the core is still in the holder and without having disturbed its orientation, such that the test surface is constantly parallel to the bottom of the holder. The hardness difference from any predetermined location on the core is calculated as the average surface hardness minus the hardness at the appropriate reference point, e.g., at the center of the core for single, solid core, such that a core surface softer than its center will have a negative hardness gradient.

In all preferred embodiments of invention, the hardness of the core at the surface is always less than or greater than (i.e., different) than the hardness of the core at the center. Furthermore, the center hardness of the core is not necessarily the hardest point in the core. Additionally, the lowest hardness anywhere in the core does not have to occur at the surface. In some embodiments, the lowest hardness value occurs within about the outer 6 mm of the core surface. However, the lowest hardness value within the core can occur at any point from the surface, up to, but not including the center, as long as the surface hardness is still different from the hardness of the center.

The above embodiments may be tailored to meet predetermined performance properties. For example, alternative embodiments include those having an inner core having an outer diameter of about 0.250 inches to about 1.550 inches, preferably about 0.500 inches to about 1.500 inches, and more preferably about 0.750 inches to about 1.400 inches. In preferred embodiments, the inner core has an outer diameter of about 1.000 inch, 1.200 inches, or 1.300 inches, with a most preferred outer diameter being 1.130 inches. The outer core layer should have an outer diameter (the entire dual core) of about 1.30 inches to about 1.620 inches, preferably 1.400 inches to about 1.600 inches, and more preferably about 1.500 inches to about 1.590 inches. In preferred embodiments, the outer core layer has an outer diameter of about 1.510 inches, 1.530 inches, or most preferably 1.550 inches.

While layers of the inventive golf ball may be formed from a variety of differing cover materials (both intermediate layer(s) and outer cover layer) described herein, preferred cover materials include, but are not limited to:

(1) Polyurethanes, such as those prepared from polyols or polyamines and diisocyanates or polyisocyanates and/or their prepolymers, and those disclosed in U.S. Pat. Nos. 5,334,673 and 6,506,851;

(2) Polyureas, such as those disclosed in U.S. Pat. Nos. 5,484,870 and 6,835,794; and (3) Polyurethane-urea hybrids, blends or copolymers comprising urethane or urea segments.

Suitable polyurethane compositions comprise a reaction product of at least one polyisocyanate and at least one curing agent. The curing agent can include, for example, one or more polyamines, one or more polyols, or a combination thereof. The polyisocyanate can be combined with one or more polyols to form a prepolymer, which is then combined with the at least one curing agent. Thus, the polyols described herein are suitable for use in one or both components of the polyurethane material, i.e., as part of a prepolymer and in the curing agent.

Suitable polyurethanes and polyureas, saturated or unsaturated, and their components, such as prepolymers, isocyanates, polyols, polyamines, curatives, etc. are disclosed in U.S. patent application Ser. No. 11/772,903, which is incorporated herein by reference thereto.

Alternatively, other suitable polymers for use in cover layers include partially- or fully-neutralized ionomers, metallocene or other single-site catalyzed polymers, polyesters, polyamides, non-ionomeric thermoplastic elastomers, copolyether-esters, copolyether-amides, polycarbonates, polybutadienes, polyisoprenes, polystryrene block copolymers (such as styrene-butadiene-styrene), styrene-ethylene-propylene-styrene, styrene-ethylene-butylene-styrene, and blends thereof. Thermosetting polyurethanes or polyureas are suitable for the outer cover layers of the golf balls of the present invention.

In a preferred embodiment, the inventive core is preferably enclosed with two cover layers, where the inner cover layer has a thickness of about 0.01 inches to about 0.06 inches, more preferably about 0.015 inches to about 0.040 inches, and most preferably about 0.02 inches to about 0.035 inches, and the inner cover layer is formed from a partially- or fully-neutralized ionomer having a Shore D hardness of greater than about 55, more preferably greater than about 60, and most preferably greater than about 65. The outer cover layer should have a thickness of about 0.015 inches to about 0.055 inches, more preferably about 0.02 inches to about 0.04 inches, and most preferably about 0.025 inches to about 0.035 inches, and has a hardness of about Shore D 60 or less, more preferably 55 or less, and most preferably about 52 or less. The inner cover layer is preferably harder than the outer cover layer. The outer cover layer may be formed of a partially- or fully-neutralized iononomer, a polyurethane, polyurea, or blend thereof. A most preferred outer cover layer is a castable or reaction injection molded polyurethane, polyurea or copolymer or hybrid thereof having a Shore D hardness of about 40 to about 50. A most preferred inner cover layer material is a partially-neutralized ionomer comprising a zinc, sodium or lithium neutralized ionomer such as SURLYN® 8940, 8945, 9910, 7930, 7940, or blend thereof having a Shore D hardness of about 63 to about 68.

In another preferred embodiment, the core having a negative hardness gradient is enclosed with a single layer of cover material having a Shore D hardness of from about 20 to about 80, more preferably about 40 to about 75 and most preferably about 45 to about 70, and comprises a thermoplastic or thermosetting polyurethane, polyurea, polyamide, polyester, polyester elastomer, polyether-amide or polyesteramide, partially or fully neutralized ionomer, polyolefin such as polyethylene, polypropylene, polyethylene copolymers such as ethylene-butyl acrylate or ethylene-methyl acrylate, poly(ethylene methacrylic acid) co- and terpolymers, metallocene-catalyzed polyolefins and polar-group functionalized polyolefins and blends thereof. One suitable cover material is an ionomer (either conventional or HNP) having a hardness of about 50 to about 70 Shore D. Another preferred cover material is a thermoplastic or thermosetting polyurethane or polyurea. A preferred ionomer is a high acid ionomer comprising a copolymer of ethylene and methacrylic or acrylic acid and having an acid content of at least 16 to about 25 weight percent. In this case the reduced spin contributed by the relatively rigid high acid ionomer may be offset to some extent by the spin-increasing negative gradient core. The core may have a diameter of about 1.0 inch to about 1.64 inches, preferably about 1.30 inches to about 1.620, and more preferably about 1.40 inches to about 1.60 inches.

Another preferred cover material comprises a castable or reaction injection moldable polyurethane, polyurea, or copolymer or hybrid of polyurethane/polyurea. Preferably, this cover is thermosetting but may be a thermoplastic, having a Shore D hardness of about 20 to about 70, more preferably about 30 to about 65 and most preferably about 35 to about 60. A moisture vapor barrier layer, such as disclosed in U.S. Pat. Nos. 6,632,147; 6,932,720; 7,004,854; and 7,182,702, all of which are incorporated by reference herein in their entirety, are optionally employed between the cover layer and the core.

While any of the embodiments herein may have any known dimple number and pattern, a preferred number of dimples is 252 to 456, and more preferably is 330 to 392. The dimples may comprise any width, depth, and edge angle disclosed in the prior art and the patterns may comprises multitudes of dimples having different widths, depths and edge angles. The parting line configuration of said pattern may be either a straight line or a staggered wave parting line (SWPL). Most preferably the dimple number is 330, 332, or 392 and comprises 5 to 7 dimples sizes and the parting line is a SWPL.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

While it is apparent that the illustrative embodiments of the invention disclosed herein fulfill the objective stated above, it is appreciated that numerous modifications and other embodiments may be devised by those skilled in the art. Therefore, it will be understood that the appended claims are intended to cover all such modifications and embodiments, which would come within the spirit and scope of the present invention.

What is claimed is:

1. A golf ball comprising:
a core comprising a thermoplastic inner core and a thermoset outer core layer, the inner core having a surface hardness of about 40 to 80 Shore C and a center hardness of about 30 to 75 Shore C and is less than the surface hardness to define a first positive hardness gradient; and
a cover comprising an inner cover layer and an outer cover layer;
wherein the thermoplastic inner core comprises a highly-neutralized ionomer comprising:
an acid copolymer of ethylene and an α,β-unsaturated carboxylic acid, optionally including a softening monomer comprising alkyl acrylate or methacrylate;
a plasticizer;
an organic acid or salt thereof; and
a cation source present in an amount sufficient to neutralize from about 70 to about 100% of all acid groups present in the material; and
the outer core layer comprises a polybutadiene rubber and has a surface hardness greater than an interior hardness to define a positive hardness gradient of less than 25 Shore C.

2. The golf ball of claim 1, wherein the thermoplastic inner core further comprises an ethylene/acid copolymer or ionomer.

3. The golf ball of claim 2, wherein the positive hardness gradient is 1 to 15 Shore C.

4. The golf ball of claim 1, wherein the acid groups of the copolymer are neutralized by 90% or greater.

5. The golf ball of claim 4, wherein the acid groups of the copolymer are neutralized by 100%.

6. The golf ball of claim 1, wherein the organic acid or salt thereof comprises barium, lithium, sodium, zinc, bismuth, chromium, cobalt, copper, potassium, strontium, titanium, tungsten, magnesium, cesium, iron, nickel, silver, aluminum, tin, or calcium salts, or salts of fatty acids.

7. The golf ball of claim 6, wherein the fatty acid salt comprises stearic acid, behenic acid, erucic acid, oleic acid, linoelic acid or dimerized derivatives thereof.

8. The golf ball of claim 6, wherein the organic acid or salt thereof comprises a magnesium salt of oleic acid.

9. The golf ball of claim 1, wherein the acid copolymer further comprises a softening comonomer.

10. The golf ball of claim 9, wherein the second polymer component comprises ionomeric copolymers and terpolymers, ionomer precursors, thermoplastics, polyamides, polycarbonates, polyesters, polyurethanes, polyureas, thermoplastic elastomers, polybutadiene rubber, balata, grafted- or non-grafted metallocene-catalyzed polymers, single-site polymers, high-crystalline acid polymers, or cationic ionomers.

11. A golf ball comprising:
a core comprising a thermoplastic inner core and a thermoset outer core layer, the inner core having a diameter of about 1.0 inches to 1.3 inches a surface hardness and a center hardness less than the surface hardness to define a first positive hardness gradient; and
a cover comprising an inner cover layer and an outer cover layer;
wherein the thermoplastic inner core comprises a highly-neutralized ionomer comprising:
an acid copolymer of ethylene and an α,β-unsaturated carboxylic acid, optionally including a softening monomer comprising alkyl acrylate or methacrylate;
a plasticizer;
an organic acid or salt thereof; and
a cation source present in an amount sufficient to neutralize from about 70 to about 100% of all acid groups present in the material; and
the outer core layer comprises a polybutadiene rubber and has a surface hardness greater than an interior hardness to define a positive hardness gradient of less than 25 Shore C.

12. The golf ball of claim 11, wherein the thermoplastic inner core further comprises an ethylene/acid copolymer or ionomer.

13. The golf ball of claim 12, wherein the positive hardness gradient is 1 to 15 Shore C.

14. The golf ball of claim 11, wherein the acid groups of the copolymer are neutralized by 90% or greater.

15. The golf ball of claim 14, wherein the acid groups of the copolymer are neutralized by 100%.

16. The golf ball of claim 11, wherein the organic acid or salt thereof comprises barium, lithium, sodium, zinc, bismuth, chromium, cobalt, copper, potassium, strontium, titanium, tungsten, magnesium, cesium, iron, nickel, silver, aluminum, tin, or calcium salts, or salts of fatty acids.

17. The golf ball of claim 15, wherein the fatty acid salt comprises stearic acid, behenic acid, erucic acid, oleic acid, linoelic acid or dimerized derivatives thereof.

18. The golf ball of claim 15, wherein the organic acid or salt thereof comprises a magnesium salt of oleic acid.

19. The golf ball of claim 11, wherein the acid copolymer further comprises a softening comonomer.

20. The golf ball of claim 19, wherein the second polymer component comprises ionomeric copolymers and terpolymers, ionomer precursors, thermoplastics, polyamides, polycarbonates, polyesters, polyurethanes, polyureas, thermoplastic elastomers, polybutadiene rubber, balata, grafted- or non-grafted metallocene-catalyzed polymers, single-site polymers, high-crystalline acid polymers, or cationic ionomers.

* * * * *